US011348233B2

(12) United States Patent
Gao et al.

(10) Patent No.: US 11,348,233 B2
(45) Date of Patent: May 31, 2022

(54) SYSTEMS AND METHODS FOR IMAGE PROCESSING

(71) Applicant: SHANGHAI UNITED IMAGING INTELLIGENCE CO., LTD., Shanghai (CN)

(72) Inventors: Yaozong Gao, Shanghai (CN); Wenhai Zhang, Shanghai (CN); Yiqiang Zhan, Shanghai (CN)

(73) Assignee: SHANGHAI UNITED IMAGING INTELLIGENCE CO., LTD., Shanghai (CN)

( * ) Notice: Subject to any disclaimer, the term of this patent is extended or adjusted under 35 U.S.C. 154(b) by 64 days.

(21) Appl. No.: 16/729,315

(22) Filed: Dec. 28, 2019

(65) Prior Publication Data
US 2020/0211188 A1    Jul. 2, 2020

(30) Foreign Application Priority Data

Dec. 28, 2018   (CN) .......................... 201811627428.3

(51) Int. Cl.
*G06T 7/00* (2017.01)
*G06N 3/04* (2006.01)
*G06T 7/11* (2017.01)

(52) U.S. Cl.
CPC ............. *G06T 7/0012* (2013.01); *G06N 3/04* (2013.01); *G06T 7/11* (2017.01);
(Continued)

(58) Field of Classification Search
CPC ...................... G06T 7/0012; G06T 7/11; G06T 2207/20081; G06T 2207/20084;
(Continued)

(56) References Cited

U.S. PATENT DOCUMENTS

| 2013/0028490 | A1* | 1/2013 | Kim | ........................ G06T 5/003 |
| | | | | 382/128 |
| 2015/0279034 | A1* | 10/2015 | Knapp | .................. G06T 7/0012 |
| | | | | 382/131 |

(Continued)

FOREIGN PATENT DOCUMENTS

| CN | 106157320 A | 11/2016 |
| CN | 107610095 A | 1/2018 |

(Continued)

OTHER PUBLICATIONS

Yun Jiang et al., Retinal Vessel Segmentation Based on Conditional Deep Convolutional Generative Adversarial Networks, Acta Automatica Sinica, 2018, 11 pages.

(Continued)

*Primary Examiner* — Vu Le
*Assistant Examiner* — Julius Chai
(74) *Attorney, Agent, or Firm* — Metis IP LLC

(57) ABSTRACT

The present disclosure provides systems and methods for image processing. The method may include obtaining an initial image; obtaining an intermediate image corresponding to the initial image, the intermediate image including pixels or voxels associated with at least a portion of a target object in the initial image; obtaining a trained processing model; and generating, based on the initial image and the intermediate image, a target image associated with the target object using the trained processing model.

20 Claims, 10 Drawing Sheets

(52) U.S. Cl.
CPC ........... *G06T 2207/20084* (2013.01); *G06T 2207/30048* (2013.01); *G06T 2207/30101* (2013.01)

(58) Field of Classification Search
CPC . G06T 2207/30004; G06T 2207/30048; G06T 2207/30101; G06T 2207/30104; G06N 3/04; G16H 30/40; G16H 50/20
See application file for complete search history.

(56) References Cited

U.S. PATENT DOCUMENTS

| | | | |
|---|---|---|---|
| 2016/0163041 A1* | 6/2016 | Tai .................... | G06T 7/136 382/128 |
| 2017/0039714 A1* | 2/2017 | Small .................. | G06T 7/0016 |
| 2017/0178307 A1* | 6/2017 | Yan ..................... | G06T 5/50 |
| 2017/0337687 A1* | 11/2017 | Wang .................. | G06T 7/11 |
| 2019/0333197 A1* | 10/2019 | Kask ................... | G06T 3/40 |
| 2020/0058126 A1* | 2/2020 | Wang .................. | G06N 3/0481 |

FOREIGN PATENT DOCUMENTS

| | | |
|---|---|---|
| CN | 108198184 A | 6/2018 |
| CN | 108986106 A | 12/2018 |

OTHER PUBLICATIONS

Yukitaka Nimura et al., Blood Vessel Segmentation using Line-Direction Vector Based on Hessian Analysis, Proceedings of SPIE—The International Society for Optical Engineering, 2010, 9 pages.
Canfei Li, Research on Methods of Medical Image Enhancement and Segmentation using PDE, Outstanding Doctoral Degree in China Full-text database of papers—Information Technology Series, 2012, 151 pages.
First Office Action in Chinese Application No. 201811627428.3 dated May 28, 2020, 17 pages.
Hongxing Qin et al., Coronary Angiography Image Segmentation and Skeleton Extraction Based on Hessian Matrix, Journal of Data Acquisition and Processing, 31(5): 911-918, 2016.
Yan Xu et al., Automated Coronary Arterial Tree Extraction using Parallel and Topology, Chinese Journal of Biomedical Engineering, 26(1): 24-29, 2007.
Xiaoyan Guo et al., Multi-scale Segmentation of Coronary Artery Image based on Active Contour Model with Shape Constraints, Journal of Image and Graphics, 21(7): 923-932, 2016.
Milletari F et al., V-Net: Fully Convolutional Neural Networks for Volumetric Medical Image Segmentation, 2016 fourth International Conference on 3d Vision, IEEE, pp. 565-571, 2016.
Qiang Li et al., Selective Enhancement Filters for Nodules, Vessels, and Airway Walls in Two-and Three-Dimensional CT Scans, Medical Physics, 30(8): 2040-2051, 2003.

* cited by examiner

1000

Image 1  Image 2  Image 3

Image A  Image B  Image C

SYSTEMS AND METHODS FOR IMAGE PROCESSING

CROSS-REFERENCE TO RELATED APPLICATIONS

This application claims priority of Chinese Patent Application No. 201811627428.3, filed on Dec. 28, 2018, the contents of which are hereby incorporated by reference.

TECHNICAL FIELD

The disclosure generally relates to image processing, and in particularly, to systems and methods for segmenting an image.

BACKGROUND

With the development of imaging technology, angiographic imaging (e.g., digital subtraction angiography (DSA)) has been widely used in medical diagnosis. Accordingly, blood vessel segmentation (i.e., extraction of blood vessel images) techniques can be used to segment (or extract) blood vessel(s) from images generated by angiographic imaging, thereby facilitating clinical diagnosis of vascular diseases. For example, a location, size, and/or shape of a lesion in a coronary artery may be identified or determined based on a coronary artery image. However, in some situations, such as for a coronary artery image, it is difficult to segment the coronary artery due to a relatively low contrast of the coronary artery and/or uneven distribution of contrast agents. Therefore, it is desirable to provide systems and methods for segmenting blood vessels accurately.

SUMMARY

In one aspect of the present disclosure, a method for image processing is provided. The method may include: obtaining an initial image; obtaining an intermediate image corresponding to the initial image, the intermediate image including pixels or voxels associated with at least a portion of a target object in the initial image; obtaining a trained processing model; and generating, based on the initial image and the intermediate image, a target image associated with the target object using the trained processing model.

In some embodiments, the obtaining an intermediate image may include: generating the intermediate image by processing the initial image using at least one filter.

In some embodiments, the generating the intermediate image by processing the initial image using at least one filter may include: determining a Hessian matrix corresponding to each pixel or voxel of the initial image; determining, based on the Hessian matrix, at least one characteristic value corresponding to the each pixel or voxel; determining a response value corresponding to the each pixel or voxel by enhancing, using a first filter of the at least one filter, the at least one characteristic value corresponding to the each pixel or voxel; and generating, based on a plurality of response values corresponding to a plurality of pixels or voxels of the initial image, the intermediate image.

In some embodiments, the first filter includes at least one of a Gaussian filter, a tubular filter, a linear filter, or a Wiener filter.

In some embodiments, the generating the intermediate image by processing the initial image using at least one filter may further include: smoothing the initial image using a second filter of the at least one filter.

In some embodiments, the second filter may include at least one of a Gaussian filter, a linear filter, or a Wiener filter.

In some embodiments, the generating the intermediate image by processing the initial image using at least one filter may include: generating one or more smoothed initial images by smoothing the initial image using one or more second filters of the at least one filter; determining a Hessian matrix corresponding to each pixel or voxel of each smoothed initial image of the one or more smoothed initial images; determining, based on the Hessian matrix, at least one characteristic value corresponding to the each pixel or voxel of the each smoothed initial image; determining a response value corresponding to the each pixel or voxel of the each smoothed initial image by enhancing, using a first filter of the at least one filter, the at least one characteristic value corresponding to the each pixel or voxel of the each smoothed initial image; determining, based on one or more response values corresponding to pixels or voxels in the one or more smoothed initial images, a target response value corresponding to each pixel or voxel of the initial image; and generating, based on a plurality of target response values corresponding to a plurality of pixels or voxels of the initial image, the intermediate image.

In some embodiments, the generating a target image may include: fusing the initial image and the intermediate image to obtain a fusion image; and inputting the fusion image into the trained processing model to generate the target image.

In some embodiments, the fusing the initial image and the intermediate image may include: generating the fusion image by processing a first value of each pixel or voxel of the initial image with a second value of a corresponding pixel or voxel of the intermediate image.

In some embodiments, the processing a first value of each pixel or voxel of the initial image with a second value of a corresponding pixel or voxel of the intermediate image may include: determining a value of a pixel or voxel of the fusion image based on a sum or product of the first value and the second value.

In some embodiments, the generating a target image may include: inputting, in a parallel mode, the initial image and the intermediate image into two different input channels of the trained processing model to generate the target image.

In some embodiments, the method may further include: obtaining an initial processing model; and training the initial processing model to obtain the trained processing model.

In some embodiments, the trained processing model may be generated according to a process, the process may include: obtaining an initial processing model; obtaining a plurality of training samples, the plurality of training samples including a plurality of initial sample images and a plurality of intermediate sample images corresponding to the plurality of initial sample images; and generating the trained processing model by training the initial processing model using the plurality of training samples.

In some embodiments, the trained processing model may be configured to segment, based on the intermediate image, the target object from the initial image.

In some embodiments, the trained processing model may include a coarse segmentation network and a fine segmentation network.

In some embodiments, the trained processing model may be a trained V-Net neural network model.

In some embodiments, the method may further include: updating the target image, including: extracting a largest connected domain in the target image as an updated target image.

In some embodiments, the target object may include a blood vessel.

In another aspect of the present disclosure, a system for image processing is provided. The system may include: at least one storage device storing executable instructions, and at least one processor in communication with the at least one storage device. When executing the executable instructions, the at least one processor may cause the system to perform operations including: obtaining an initial image; obtaining an intermediate image corresponding to the initial image, the intermediate image including pixels or voxels associated with at least a portion of a target object in the initial image; obtaining a trained processing model; and generating, based on the initial image and the intermediate image, a target image associated with the target object using the trained processing model.

In another aspect of the present disclosure, a non-transitory computer readable medium is provided. The non-transitory computer readable medium may include at least one set of instructions for image processing, wherein when executed by one or more processors of a computing device, the at least one set of instructions may cause the computing device to perform a method. The method may include: obtaining an initial image; obtaining an intermediate image corresponding to the initial image, the intermediate image including pixels or voxels associated with at least a portion of a target object in the initial image; obtaining a trained processing model; and generating, based on the initial image and the intermediate image, a target image associated with the target object using the trained processing model.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise.

It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that the term "object" and "subject" may be used interchangeably as a reference to a thing that undergoes a treatment and/or an imaging procedure in a radiation system of the present disclosure.

It will be understood that the term "system," "engine," "unit," "module," and/or "block" used herein are one method to distinguish different components, elements, parts, section or assembly of different level in ascending order. However, the terms may be displaced by another expression if they achieve the same purpose.

Figure 2:
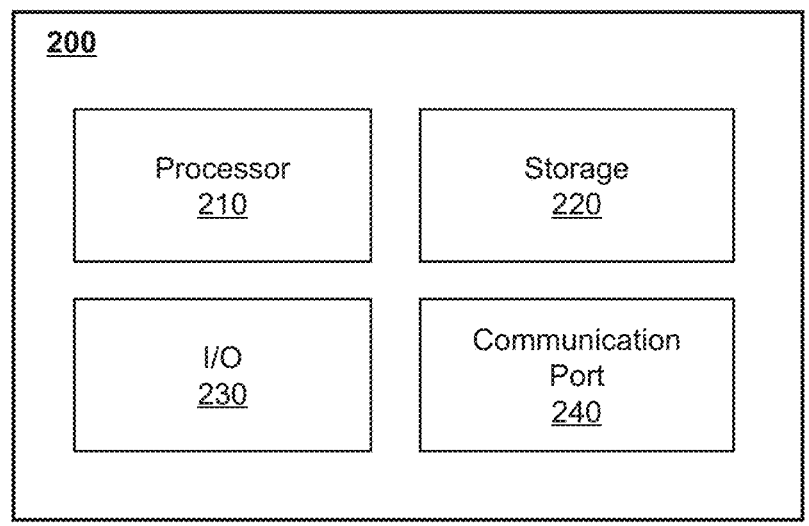
FIG. 2 is a schematic diagram illustrating exemplary hardware and/or software components of an exemplary computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may apply to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

As used herein, a representation of an object (e.g., a patient, or a portion thereof) in an image may be referred to the object for brevity. For instance, a representation of an organ or tissue (e.g., the heart, the liver, a lung, a blood vessel, etc., of a patient) in an image may be referred to as the organ or tissue for brevity. As used herein, an operation on a representation of an object in an image may be referred to as an operation on the object for brevity. For instance, a segmentation of a portion of an image including a representation of an organ or tissue (e.g., the heart, the liver, a lung, a blood vessel, etc., of a patient) from the image may be referred to as a segmentation of the organ or tissue for brevity.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood the operations of the flowcharts may be implemented not in order. Conversely, the operations may be implemented in inverted order, or simultaneously. Moreover, one or more other operations may be added to the flowcharts. One or more operations may be removed from the flowcharts.

Provided herein are systems and methods for segmenting a target object from an initial image. A system may include at least one storage device storing executable instructions, and at least one processor in communication with the at least one storage device. When executing the executable instructions, the at least one processor may cause the system to obtain an initial image. The system may obtain an intermediate image corresponding to the initial image. The intermediate image may include pixels or voxels associated with at least a portion of a target object in the initial image. The system may obtain a trained processing model. The system may generate, based on the initial image and the intermediate image, a target image associated with the target object using the trained processing model.

Accordingly, the system may input two images, the initial image including a representation of a subject and the intermediate image including a coarse representation of a target object of the subject, into the trained processing model to generate a target image associated with the target object. The systems and methods of the present disclosure can be conveniently applied in various clinical applications (e.g., blood vessel segmentation, bone segmentation, trachea segmentation, etc.) including, for example, the segmentation of target objects with relatively complex structures (e.g., a coronary artery). Merely by way of example, the initial image may include a representation of the heart, and the intermediate image may include a coarse representation of blood vessel(s) (e.g., a coronary artery). The systems and methods may generate a target image including a fine representation of the blood vessel(s) (e.g., an image including a fine representation of the coronary artery). Accordingly, the systems and methods can improve the accuracy and efficiency of blood vessel (e.g., coronary artery) segmentation.

It should be understood that application scenarios of systems and methods disclosed herein are only some exemplary embodiments provided for the purposes of illustration, and not intended to limit the scope of the present disclosure. For persons having ordinary skills in the art, multiple variations and modifications may be made under the teachings of the present disclosure.

Figure 1:
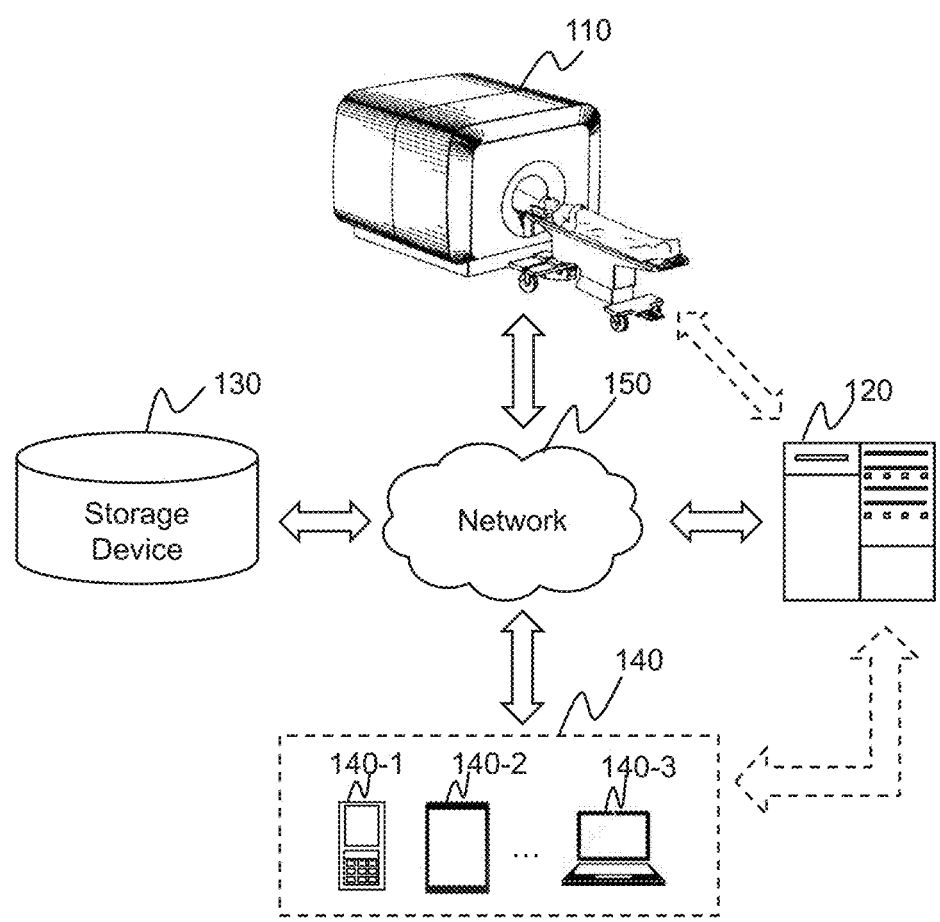
FIG. 1 is a schematic diagram illustrating an exemplary application scenario of an imaging processing system according to some embodiments of the present disclosure.

FIG. 1 is a schematic diagram illustrating an exemplary application scenario of an image processing system according to some embodiments of the present disclosure. As shown in FIG. 1, the image processing system 100 may include an imaging device 110, a processing device 120, a storage device 130, one or more terminals 140, and a network 150.

The components in the image processing system 100 may be connected in one or more of various ways. Merely by way of example, the imaging device 110 may be connected to the processing device 120 through the network 150. As another example, the imaging device 110 may be connected to the processing device 120 directly as indicated by the bi-directional arrow in dotted lines linking the imaging device 110 and the processing device 120. As a further example, the terminal(s) 140 may be connected to another component of the image processing system 100 (e.g., the processing device 120) via the network 150. As still a further example, the terminal(s) 140 may be connected to the processing device 120 directly as illustrated by the dotted arrow in FIG. 1. As still a further example, the storage device 130 may be connected to another component of the image processing system 100 (e.g., the processing device 120) directly or through the network 150.

The imaging device 110 may be configured to acquire imaging data relating to at least one part of a subject. The imaging device 110 may scan the subject or a portion thereof that is located within its detection region and generate imaging data relating to the subject or the portion thereof. The imaging data may include an image (e.g., an image slice), projection data, or a combination thereof. In some embodiments, the imaging data may be two-dimensional (2D) imaging data, three-dimensional (3D) imaging data, four-dimensional (4D) imaging data, or the like, or any combination thereof. The subject may be biological or non-biological. For example, the subject may include a patient, a man-made object, etc. As another example, the subject may include a specific portion, organ, and/or tissue of the patient. As a further example, the subject may include the head, the neck, the thorax, the heart, the stomach, a blood vessel, soft tissue, a tumor, nodules, or the like, or any combination thereof.

In some embodiments, the imaging device 110 may be implemented in a configuration of a single modality imaging device. For example, the imaging device 110 may include a digital subtraction angiography (DSA) device, a positron emission tomography (PET) device, a single-photon emission computed tomography (SPECT) device, a magnetic resonance imaging (MRI) device (also referred to as an MR device, an MR scanner), a computed tomography (CT) device, an ultrasonography scanner, a digital radiography (DR) scanner, or the like, or any combination thereof. In some embodiments, the imaging device 110 may be implemented in a configuration of a multi-modality imaging device. Exemplary multi-modality imaging devices may include a PET-CT device, a PET-MRI device, or the like, or a combination thereof.

The processing device 120 may process data and/or information obtained from the imaging device 110, the terminal(s) 140, and/or the storage device 130. For example, the processing device 120 may obtain an initial image. The processing device 120 may obtain an intermediate image corresponding to the initial image. The intermediate image may include pixels or voxels associated with at least a portion of a target object in the initial image. The processing device 120 may obtain a trained processing model. The processing device 120 may generate, based on the initial image and the intermediate image, a target image associated with the target object using the trained processing model. The trained processing model may be updated from time to time, e.g., periodically or not, based on a sample set that is at least partially different from the original sample set from which the trained processing model is originally determined. For instance, the trained processing model may be updated based on a sample set including new samples that are not included in the original sample set. In some embodiments, the determination and/or updating of the trained processing model may be performed on a processing device, while the application of the trained processing model may be performed on a different processing device. In some embodiments, the determination and/or updating of the trained processing model may be performed on a processing device of a system different from the image processing system 100 (or a server different from a server including the processing device 120 on which the application of the trained processing model is performed). For instance, the determination and/or updating of the trained processing model may be performed on a first system of a vendor who provides and/or maintains such a processing model and/or has access to training samples used to determine and/or update the trained processing model, while image segmentation based on the provided trained processing model may be performed on a second system of a client of the vendor. In some embodiments, the determination and/or updating of the trained processing model may be performed online in response to a request for image segmentation. In some embodiments, the determination and/or updating of the trained processing model may be performed offline.

In some embodiments, the processing device 120 may be a computer, a user console, a single server or a server group, etc. The server group may be centralized or distributed. In some embodiments, the processing device 120 may be local or remote. For example, the processing device 120 may access information and/or data stored in the imaging device 110, the terminal(s) 140, and/or the storage device 130 via the network 150. As another example, the processing device 120 may be directly connected to the imaging device 110, the terminal(s) 140 and/or the storage device 130 to access stored information and/or data. In some embodiments, the processing device 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 120 may be implemented by a computing device 200 having one or more components as described in FIG. 2.

In some embodiments, the processing device 120 may process data and/or information obtained from an external resource. For example, the processing device 120 may obtain a trained processing model from a third party (e.g., an external storage device of a medical institution, a public service organization, or a medical company, or the like) that provides the trained processing model via the network 150. The processing device 120 may generate a target image using the trained processing model. In some embodiments, the processing device 120, or a portion of the processing device 120 may be integrated into the imaging device 110.

The storage device 130 may store data, instructions, and/or any other information. In some embodiments, the storage device 130 may store data obtained from the imaging device 110, the terminal(s) 140 and/or the processing device 120. In some embodiments, the storage device 130 may store data and/or instructions that the processing device 120 may execute or use to perform exemplary methods/systems described in the present disclosure. In some embodiments, the storage device 130 may include a mass storage device, a removable storage device, a volatile read-and-write memory, a read-only memory (ROM), or the like, or any combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memories may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 130 may be connected to the network 150 to communicate with one or more other components (e.g., the processing device 120, the terminal(s) 140, etc.) in the image processing system 100. One or more components in the image processing system 100 may access the data or instructions stored in the storage device 130 via the network 150. In some embodiments, the storage device 130 may be directly connected to or communicate with one or more other components (e.g., the processing device 120, the terminal(s) 140, etc.) in the image processing system 100. In some embodiments, the storage device 130 may be part of the processing device 120.

In some embodiments, a user (e.g., a doctor, or an operator) may operate the image processing system 100 through the terminal(s) 140. The terminal(s) 140 may include a mobile device 140-1, a tablet computer 140-2, a laptop computer 140-3, or the like, or any combination thereof. In some embodiments, the mobile device 140-1 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, eyeglasses, a helmet, a watch, clothing, a backpack, a smart accessory, or the like, or any combination thereof. In some embodiments, the mobile device may include a mobile phone, a personal digital assistant (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the terminal(s) 140 may be part of the processing device 120.

The network 150 may include any suitable network that can facilitate the exchange of information and/or data for the image processing system 100. In some embodiments, one or more components (e.g., the imaging device 110, the processing device 120, the storage device 130, the terminal(s) 140, etc.) of the image processing system 100 may communicate information and/or data with one or more other components of the image processing system 100 via the network 150. For example, the processing device 120 may obtain data from the imaging device 110 via the network 150. As another example, the processing device 120 may obtain user instructions from the terminal(s) 140 via the network 150. The network 150 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 150 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 150 may include one or more network access points. For example, the network 150 may include wired and/or wireless network access points, such as base stations and/or internet exchange points, through which one or more components of the image processing system 100 may be connected to the network 150 to exchange data and/or information.

It should be noted that the above description of the image processing system 100 is merely provided for the purposes of illustration, and not intended to limit the scope of the present disclosure. For persons having ordinary skills in the art, multiple variations and modifications may be made under the teachings of the present disclosure. For example, the assembly and/or function of the image processing system 100 may be varied or changed according to specific implementation scenarios.

FIG. 2 is a schematic diagram illustrating exemplary hardware and/or software components of an exemplary computing device according to some embodiments of the present disclosure. The computing device 200 may be used to implement any component of the image processing system 100 as described herein. For example, the processing device 120 and/or the terminal(s) 140 may be implemented on the computing device 200, respectively, via its hardware, software program, firmware, or a combination thereof. Although only one such computing device is shown, for convenience, the computer functions relating to the image processing system 100 as described herein may be implemented in a distributed manner on a number of similar platforms, to distribute the processing load.

As shown in FIG. 2, the computing device 200 may include a processor 210, a storage 220, an input/output (I/O) 230, and a communication port 240.

The processor 210 may execute computer instructions (e.g., program codes) and perform functions of the image processing system 100 (e.g., the processing device 120) in accordance with techniques described herein. The computer instructions may include, for example, routines, programs, objects, components, signals, data structures, procedures, modules, and functions, which perform particular functions described herein. For example, the processor 210 may process data obtained from the imaging device 110, the terminal(s) 140, the storage device 130, and/or any other component of the image processing system 100. Specifically, the processor 210 may process one or more measured data sets obtained from the imaging device 110. For example, the processor 210 may generate an image based on the data set(s). In some embodiments, the generated image may be stored in the storage device 130, the storage 220, etc. In some embodiments, the generated image may be displayed on a display device by the I/O 230. In some embodiments, the processor 210 may perform instructions obtained from the terminal(s) 140. In some embodiments, the processor 210 may include one or more hardware processors, such as a microcontroller, a microprocessor, a reduced instruction set computer (RISC), an application-specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field-programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage 220 may store data/information obtained from the imaging device 110, the terminal(s) 140, the storage device 130, or any other component of the image processing system 100. In some embodiments, the storage 220 may include a mass storage device, a removable storage device, a volatile read-and-write memory, a read-only memory (ROM), or the like, or any combination thereof. For example, the mass storage device may include a magnetic disk, an optical disk, a solid-state drive, etc. The removable storage device may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for generating a target image associated with a target object.

The I/O 230 may input and/or output signals, data, and/or information, etc. In some embodiments, the I/O 230 may enable user interaction with the image processing system 100 (e.g., the processing device 120). In some embodiments, the I/O 230 may include an input device and an output device. Exemplary input devices may include a keyboard, a mouse, a touch screen, a microphone, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 240 may be connected with a network (e.g., the network 150) to facilitate data communications. The communication port 240 may establish connections between the processing device 120 and the imaging device 110, the terminal(s) 140, or the storage device 130. The connection may be a wired connection, a wireless connection, or a combination of both that enables data transmission and reception. The wired connection may include an electrical cable, an optical cable, a telephone wire, or the like, or any combination thereof. The wireless connection may include a Bluetooth network, a Wi-Fi network, a WiMax network, a WLAN, a ZigBee network, a mobile network (e.g., 3G, 4G, 5G, etc.), or the like, or any combination thereof. In some embodiments, the communication port 240 may be a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
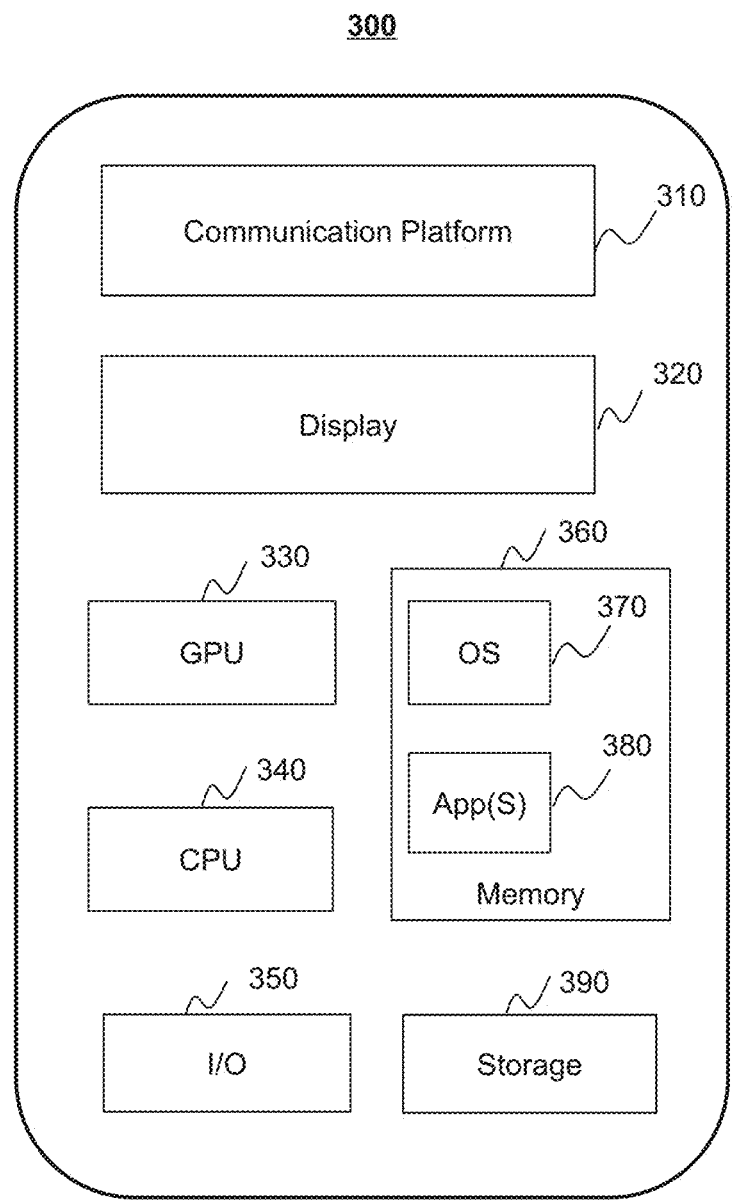
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, an operating system 370 (e.g., iOS™, Android™, Windows Phone™, Harmony OS, etc.) and one or more applications (Apps) 380 may be loaded into the memory 360 from the storage 390 in order to be executed by the CPU 340. The applications 380 may include a browser or any other suitable mobile apps for receiving and rendering information relating to image processing or other information from the processing device 120. User interactions with the information stream may be achieved via the I/O 350 and provided to the processing device 120 and/or other components of the image processing system 100 via the network 150. In some embodiments, a user may input parameters to the image processing system 100, via the mobile device 300.

In order to implement various modules, units and their functions described above, a computer hardware platform may be used as hardware platforms of one or more elements (e.g., the processing device 120 and/or other components of the image processing system 100 described in FIG. 1). Since these hardware elements, operating systems and program languages are common; it may be assumed that persons skilled in the art may be familiar with these techniques and they may be able to provide information needed in the imaging and assessing according to the techniques described in the present disclosure. A computer with the user interface may be used as a personal computer (PC), or other types of workstations or terminal devices. After being properly programmed, a computer with the user interface may be used as a server. It may be considered that those skilled in the art may also be familiar with such structures, programs, or general operations of this type of computing device.

Figure 4A:
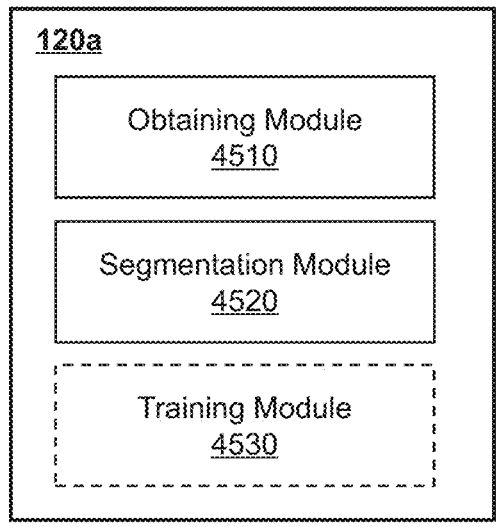
FIG. 4A is a block diagram illustrating an exemplary processing device according to some embodiments of the present disclosure.

FIG. 4A is a block diagram illustrating an exemplary processing device according to some embodiments of the present disclosure. In some embodiments, the processing device 120a may be configured to segment one or more target objects (e.g., blood vessels) in an initial image from the background (e.g., regions including interfering objects) of the initial image. The processing device 120a may be implemented as software and/or hardware. In some embodiments, the processing device 120a may be part of an imaging device (e.g., the imaging device 110). More descriptions about the imaging device may be found elsewhere in the present disclosure (e.g., FIG. 1 and the descriptions thereof).

As illustrated in FIG. 4A, the processing device 120a may include an obtaining module 4510, and a segmentation module 4520.

Each of the modules may be a hardware circuit that is designed to perform certain actions, e.g., according to a set of instructions stored in one or more storage media, and/or any combination of the hardware circuit and one or more storage media.

The obtaining module 4510 may be configured to obtain an initial image and/or an intermediate image corresponding to the initial image.

The segmentation module 4520 may be configured to input the initial image and the intermediate image into a trained processing model to generate a target image associated with one or more target objects.

In some embodiments, the initial image and the intermediate image may be obtained by the obtaining module 4510, and the initial image and the intermediate image may be inputted into the trained processing model by the segmentation module 4520. As a result, the target image may be generated. In comparison with traditional segmentation techniques (e.g., blood vessel segmentation techniques) that are not suitable for the segmentation of target objects with relatively complicated structures (e.g., coronary arteries), the trained processing model may be used to segment target objects more precisely, and accordingly, the segmentation accuracy of the target objects may be improved.

In some embodiments, the segmentation module 4520 may include a fusion unit (not shown). The fusion unit may be configured to fuse the initial image and the intermediate image to generate a fusion image and input the fusion image into the trained processing model.

Alternatively, and/or additionally, the fusion unit may further be configured to input in a parallel mode the initial image and the intermediate image into two different input channels of the trained processing model, and input the initial image and the intermediate image into the trained processing model through the corresponding input channels, respectively.

Alternatively, and/or additionally, the fusion unit may further be configured to determine the fusion image based on a sum or product of each pixel or voxel of the initial image and a corresponding pixel or voxel of the intermediate image, and input the fusion image into the trained processing model.

In some embodiments, the obtaining module 4510 may include an extraction unit (not shown). The extraction unit may be configured to process the initial image using one or more filters to generate the intermediate image.

Alternatively, and/or additionally, the extraction unit may further be configured to determine a Hessian matrix corresponding to each pixel or voxel of the initial image, and determine at least one characteristic value corresponding to the each pixel or voxel based on the Hessian matrix. The extraction unit may determine a response value corresponding to the each pixel or voxel by enhancing the at least one characteristic value corresponding to the each pixel or voxel using a first filter (e.g., a tubular filter or a linear filter). The extraction unit may generate the intermediate image based on a plurality of response values corresponding to a plurality of pixels or voxels of the initial image.

Alternatively, and/or additionally, the extraction unit may further be configured to smooth, before determining the Hessian matrix corresponding to the each pixel or voxel of the initial image, the initial image using one or more second filters (e.g., Gaussian filters with kernels of different sizes) to generate one or more smoothed initial images. The one or more smoothed initial images may be processed to generate the intermediate image.

In some embodiments, the extraction unit may be configured to select a maximum response value corresponding to each pixel or voxel of the initial image among one or more response values corresponding to pixels or voxels at a same position in the one or more smoothed initial images. The extraction unit may generate the intermediate image based on a plurality of maximum response values corresponding to a plurality of pixels or voxels of the initial image.

In some embodiments, the processing device 120a may further include a training module 4530. The training module may be configured to train an initial processing model to generate the trained processing model before the usage of the trained processing model. More descriptions about the training module may be found elsewhere in the present disclosure (e.g., FIG. 4B and the descriptions thereof).

In some embodiments, the processing device 120a may further include an extraction module (not shown) configured to extract a largest connected domain in the target image as an updated target image after generating the target image.

It should be noted that the above descriptions about the processing device 120a are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, some other components/modules (e.g., a storage module) may be added into the processing device 120a. In some embodiments, the training module 4530 may be omitted. In some embodiments, the training module 4530 may be implemented on another processing device 120b as illustrated in FIG. 4B.

Figure 4B:
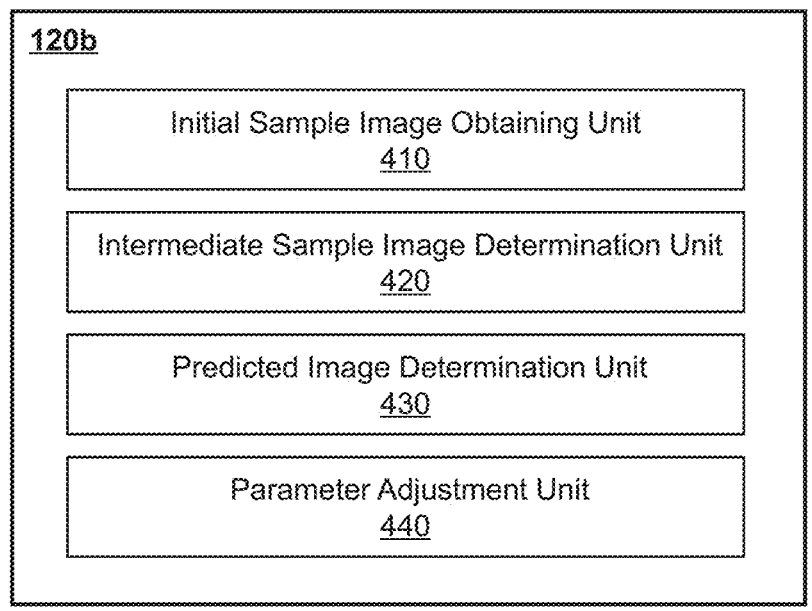
FIG. 4B is a block diagram illustrating another exemplary processing device according to some embodiments of the present disclosure.

FIG. 4B is a block diagram illustrating another exemplary processing device according to some embodiments of the present disclosure. As illustrated in FIG. 4B, the processing device 120b may include an initial sample image obtaining unit 410, an intermediate sample image determination unit 420, a predicted image determination unit 430, and a parameter adjustment unit 440. Each of the modules described above may be a hardware circuit that is designed to perform certain actions, e.g., according to a set of instructions stored in one or more storage media, and/or any combination of the hardware circuit and one or more storage media.

The initial sample image obtaining unit 410 may be configured to obtain a plurality of initial sample images.

The intermediate sample image determination unit 420 may be configured to generate a plurality of intermediate sample images based on the plurality of initial sample images. Each of the plurality of intermediate sample images may correspond to an initial sample image.

The predicted image determination unit 430 may be configured to input each initial sample image and a corresponding intermediate sample image into an initial processing model to generate a predicted image corresponding to the initial sample image.

The parameter adjustment unit 440 may be configured to adjust and/or update one or more parameters of the processing model based on a difference between each predicted image and a corresponding desired target image.

In some embodiments, the predicted image determination unit 430 may include an image fusion sub-unit (not shown). The image fusion sub-unit may be configured to fuse each initial sample image and a corresponding intermediate sample image to generate a fusion sample image and input the fusion sample image into the processing model.

Alternatively, and/or additionally, the image fusion sub-unit may further be configured to input each initial sample image and the corresponding intermediate sample image into two different input channels of the processing model, and input the images into the processing model.

In some embodiments, the image fusion sub-unit may further be configured to generate the fusion sample image based on a sum or product of each pixel or voxel of the initial sample image and a corresponding pixel or voxel of the intermediate sample image, and input the fusion sample image into the processing model.

In some embodiments, the intermediate sample image determination unit 420 may include a filtering sub-unit (not shown). The filtering sub-unit may be configured to process an initial sample image using one or more filters to generate an intermediate sample image.

In some embodiments, the filtering sub-unit may further be configured to determine at least one characteristic value of a Hessian matrix corresponding to each pixel or voxel of the initial sample image. The filtering sub-unit may determine a response value corresponding to each pixel or voxel of the initial sample image by enhancing the at least one characteristic value corresponding to each pixel or voxel of the initial sample image using a first filter (e.g., a tubular filter, or a linear filter). The filtering sub-unit may generate the intermediate sample image based on a plurality of response values corresponding to a plurality of pixels or voxels of the initial sample image.

Alternatively and/or additionally, before determining the Hessian matrix corresponding to the each pixel or voxel of the initial sample image, the filtering sub-unit may further be configured to smooth the initial sample image using one or more second filters (e.g., Gaussian filters with kernels of different sizes) to generate one or more smoothed initial sample images. The one or more smoothed initial sample images may be processed to generate the intermediate sample image.

In some embodiments, the one or more second filters may include a Gaussian filter, a tubular filter, a linear filter, a Wiener filter, or the like, or any combination thereof.

Alternatively, and/or additionally, the filtering sub-unit may further be configured to select a maximum response value corresponding to each pixel or voxel of the initial sample image among one or more response values corresponding to pixels or voxels at a same position in the one or more smoothed initial sample images. The filtering sub-unit may generate the intermediate sample image based on a plurality of maximum response values corresponding to a plurality of pixels or voxels of the initial sample image.

In some embodiments, the processing model may include a convolutional neural network (CNN) model (e.g., a U-Net neural network model, or a V-Net neural network model), a deep CNN (DCNN) model, a fully convolutional network (FCN) model, a recurrent neural network (RNN) model, or the like, or any combination thereof.

In some embodiments, the processing device 120a or 120b may execute any operation of the present disclosure, and may include one or more other modules for performing a corresponding function in the operations.

It should be noted that the above descriptions about the processing device 120b are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the initial sample image obtaining unit 410 and the intermediate sample image determination unit 420 may be integrated into a single module. As another example, some other components/modules (e.g., a storage unit) may be added into the processing device 120b.

Figure 5:
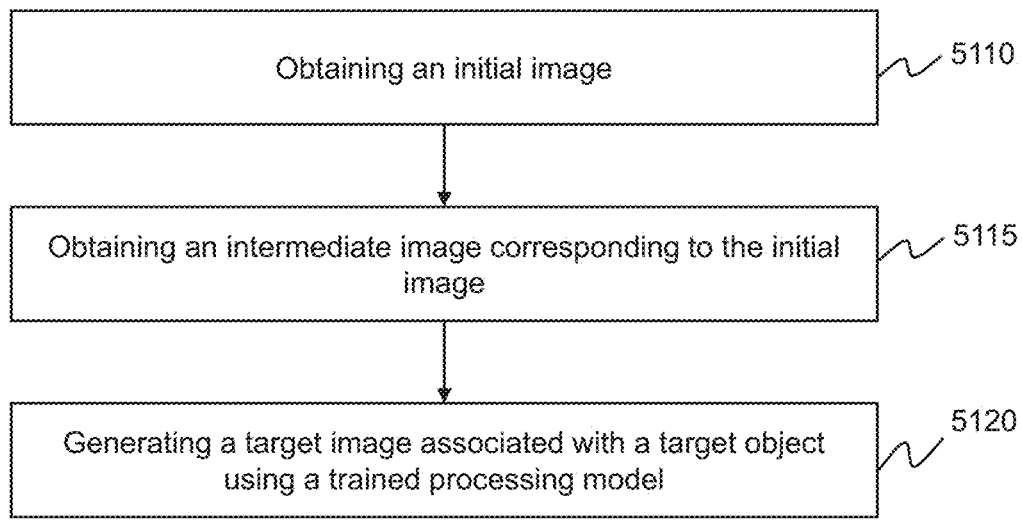
FIG. 5 is a flowchart illustrating an exemplary process for generating a target image associated with one or more target objects according to some embodiments of the present disclosure.

FIG. 5 is a flowchart illustrating an exemplary process for generating a target image associated with one or more target objects according to some embodiments of the present disclosure.

In some embodiments, the process 500 may be implemented as a set of instructions (e.g., an application) stored in the storage device 130, storage 220, or storage 390. The processing device 120, the processor 210 and/or the CPU 340 may execute the set of instructions, and when executing the instructions, the processing device 120, the processor 210 and/or the CPU 340 may be configured to perform the process 500. The operations of the illustrated process presented below are intended to be illustrative. In some embodiments, the process 500 may be accomplished with one or more additional operations not described and/or without one or more of the operations discussed. Additionally, the order of the operations of the process 500 illustrated in FIG. 5 and described below is not intended to be limiting.

In some embodiments, the process 500 may be performed to separate one or more target objects (e.g., blood vessels) in an initial image from a background of the initial image. In some embodiments, the process 500 may be executed by a target object segmentation device implemented as software and/or hardware. In some embodiments, the target object segmentation device may be part of an imaging device (e.g., the imaging device 110). More descriptions about the imaging device may be found elsewhere in the present disclosure (e.g., FIG. 1 and the descriptions thereof).

In some embodiments, the one or more target objects may have the same or similar shapes. An object having a shape substantially different from that of the one or more target objects may be referred to as an interfering object. For example, if each of the one or more target objects has a linear shape, then the interfering objects may have a dot shape, a plane shape, a globular shape, or the like. As another example, if each of the one or more target objects has a dot shape, then the interfering objects may have a linear shape, a plane shape, a globular shape, or the like. In some embodiments, the one or more target objects may have the same or similar grey levels. In some embodiments, the grey levels of the target objects may be different from the grey levels of the interfering objects. The background of the initial image may refer to one or more regions including representations of the interfering objects in the initial image. For example, for a heart CT image, if the one or more target objects are coronary arteries, regions including representations of the cardiac muscles, the spleen, the lungs, the thorax, the stomach, bones, or the like, in the heart CT image may be regarded as the background.

In some embodiments, segmenting the one or more target objects from the initial image (or separating the target objects from the background of the initial image) may refer to generating a target image associated with (or including representations of) the one or more target objects. In some embodiments, the target object segmentation device may be referred to as a processing device (e.g., the processing device 120). In some embodiments, the target object segmentation device may be part of the processing device 120.

In some embodiments, as shown in FIG. 5, an exemplary target image generation process is provided. The process 500 may include one or more of the following operations.

In 5110, an initial image may be obtained. In 5115, an intermediate image corresponding to the initial image may be obtained.

In some embodiments, the processing device 120*a* (e.g., the obtaining module 4510) may perform operation 5110. In some embodiments, the processing device 120*a* (e.g., the obtaining module 4510) may perform operation 5115.

In some embodiments, the initial image may be generated based on imaging data (e.g., projection data) acquired by the imaging device 110. For example, the imaging data may be acquired by scanning a subject within the detection region of the imaging device 110. In some embodiments, the initial image may be a CT image, an MR image, a DSA image, a PET image, a SPECT image, a DR image, or the like. The intermediate image may be generated by processing the initial image. For example, the intermediate image may be generated by extracting or segmenting one or more target objects from the initial image. The intermediate image may include a coarse representation of the one or more target objects (or at least a portion thereof).

In some embodiments, the subject may include a patient or a portion thereof (e.g., the heart, the head, the neck, the thorax, the stomach, soft tissue, a tumor, nodules, etc.) as described elsewhere in the present disclosure (e.g., FIG. 1 and the descriptions thereof). The subject may include one or more target objects. An exemplary target object may include a blood vessel (e.g., a blood vessel of a heart), a nodule in an organ (e.g., a liver, a kidney), etc. In some embodiments, the initial image may be generated based on imaging data acquired after a contrast agent is injected into blood vessels, and the target objects may include the blood vessels. In some embodiments, the initial image may include a plurality of first pixels or voxels representing the subject. In some embodiments, the first pixels or voxels may have corresponding pixel/voxel values or characteristics (e.g., luminance values, grey values, colors (e.g., RGB values), saturation values, etc.).

Figures 11A, 11B:
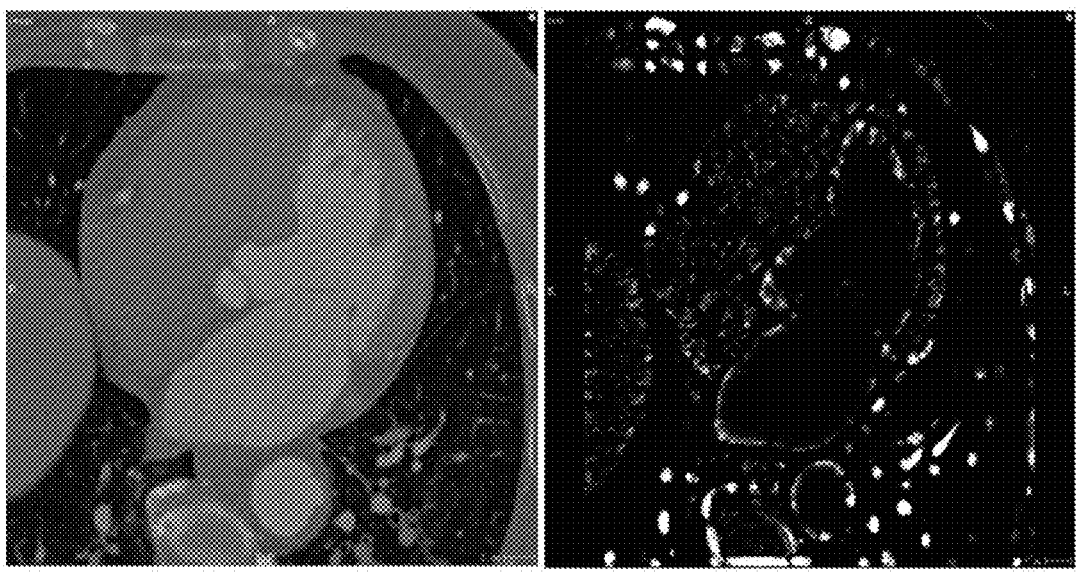
FIG. 11A shows an exemplary initial image according to some embodiments of the present disclosure.
FIG. 11B shows an exemplary intermediate image corresponding to the initial image according to some embodiments of the present disclosure.

The intermediate image may include a plurality of second pixels or voxels associated with at least a portion of the one or more target objects in the initial image. In some embodiments, a second pixel or voxel in the intermediate image may correspond to a first pixel or voxel in the initial image. That is, a second pixel or voxel in the intermediate image and a corresponding first pixel or voxel in the initial image may represent a same physical portion or position of the subject. In some embodiments, the intermediate image (including a coarse representation of the target objects) may include less details than the initial image or a target image that includes a fine representation of the target objects. In comparison with the intermediate image, the target image may include a precise and/or accurate representation of the target objects. For example, the target image may include relatively complete information of the one or more target objects, while the intermediate image may include less information of the target objects or may further include, in addition to the representation of the target objects, representations of one or more interfering objects. As another example, if the initial image is a heart image (e.g., as shown in FIG. 11A), and the target objects include the coronary artery, then the intermediate image (e.g., as shown in FIG. 11B) may include a coarse representation of a portion of the coronary artery, a portion of interfering objects (e.g., one or more blood vessels other than the coronary artery, a trachea, etc.), while the target image may only include a fine representation of the coronary artery. In some embodiments, the intermediate image may include a skeleton or a framework (or a portion thereof) of the target objects.

In some embodiments, the one or more target objects (e.g., the blood vessels) may be extracted or segmented from the initial image to generate the intermediate image based on one or more segmentation algorithms (e.g., a threshold segmentation algorithm), one or more filters, or the like, or any combination thereof. Exemplary filters may include a Gaussian filter, a linear filter, a tubular filter (or a coaxial filter), a Wiener filter, a threshold filter, or the like, or any combination thereof.

Exemplary segmentation algorithms may include a threshold segmentation algorithm, a region growing segmentation algorithm, an energy-based 3D reconstruction segmentation algorithm, a level set-based segmentation algorithm, a region split and/or merge segmentation algorithm, an edge tracking segmentation algorithm, a statistical pattern recognition algorithm, a C-means clustering segmentation algorithm, a deformable model segmentation algorithm, a graph search segmentation algorithm, a neural network segmentation algorithm, a geodesic minimal path segmentation algorithm, a target tracking segmentation algorithm, an atlas-based segmentation algorithm, a rule-based segmentation algorithm, a coupled surface segmentation algorithm, a model-based segmentation algorithm, a deformable organism segmentation algorithm, a model matching algorithm, an artificial intelligence algorithm, or the like, or any combination thereof.

In some embodiments, to generate the intermediate image efficiently, the processing device 120 may remove at least a portion of background information from the initial image. For example, for a heart CT image, if the target objects are blood vessels, the processing device 120 may remove at least a portion of the representations of the cardiac muscles, the spleen, the thorax, the stomach, the lungs, bones, or the like. As another example, the processing device 120 may remove at least a portion of the representations of organs far away from the target objects. The processing device 120 may reserve representations of regions similar to or the same as the blood vessels.

In some embodiments, a Hessian matrix corresponding to each first pixel or voxel of the initial image may be determined. At least one characteristic value corresponding to the each first pixel of voxel may be determined based on the Hessian matrix. A response value corresponding to the each first pixel or voxel may be determined by enhancing the at least one characteristic value corresponding to the each first pixel or voxel using a first filter (e.g., if the one or more target objects have a linear shape, the first filter may be a tubular filter). The intermediate image may be generated based on a plurality of response values corresponding to the plurality of first pixels or voxels of the initial image. In some embodiments, before determining the at least one characteristic value of the Hessian matrix corresponding to the each first pixel or voxel, the initial image may be smoothed using a second filter (e.g., a Gaussian filter). The first filter may be the same as or different from the second filter. For example, the first filter may be a tubular filter, while the second filter may be a Gaussian filter. As another example, both the first filter and the second filter may be tubular filters. More descriptions for determining the intermediate image based on the Hessian matrix may be found elsewhere in the present disclosure (e.g., FIG. 8 and the descriptions thereof).

In some embodiments, the one or more filters used for processing the initial image may be determined based on a shape of the target objects. For example, if the target objects have a dot shape (e.g., dot nodules), a dot filter may be used for processing the initial image. As another example, if the target objects have a linear shape (e.g., blood vessels), a tubular filter or a line filter may be used for processing the initial image. In some embodiments, blood vessel segmentation is described for illustration purposes, and a tubular filter is taken as an example in the present disclosure.

In some embodiments, the initial image may be obtained from the imaging device (e.g., the imaging device 110), the storage device 130, or any other storage device (e.g., a cloud platform). For example, the initial image may be generated by a processing device (e.g., the processing device 120, or a processing device other than the processing device 120), and stored in the imaging device, the storage device 130, or any other storage device. In some embodiments, the processing device 120 may obtain the initial image from the imaging device, the storage device 130, or any other storage device directly. In some embodiments, the imaging device may transmit acquired imaging data (e.g., projection data) to the storage device 130, or any other storage device for storage, and the processing device 120 may obtain the imaging data from the storage device 130, or any other storage device, and generate the initial image based on the imaging data.

In some embodiments, the intermediate image may be obtained from the imaging device (e.g., the imaging device 110), the storage device 130, or any other storage device (e.g., the cloud platform). For example, the intermediate image may be generated based on the initial image by a processing device (e.g., the processing device 120, or a processing device other than the processing device 120), and stored in the imaging device (e.g., the imaging device 110), the storage device 130, or any other storage device. In some embodiments, the processing device 120 may obtain the intermediate image from the imaging device, the storage device 130, or any other storage device directly. In some embodiments, the processing device 120 may obtain the intermediate image by processing the initial image.

In 5120, a target image associated with a target object may be generated. In some embodiments, the initial image and the intermediate image may be inputted into a trained processing model to generate the target image.

In some embodiments, the processing device 120a (e.g., the segmentation module 4520) may perform operation 5120.

In some embodiments, the trained processing model may be obtained by training an initial processing model based on a plurality of training samples. In some embodiments, the processing model may include a convolutional neural network (CNN) model (e.g., a U-Net neural network model, or a V-Net neural network model), or the like, or any combination thereof.

The trained processing model may be configured to segment the one or more target objects from the initial image based on the intermediate image. In some embodiments, the trained processing model may include a coarse segmentation network and/or a fine segmentation network. Each segmentation network may correspond to a stage of the trained processing model. The coarse segmentation network may be configured to roughly determine locations of the one or more target objects in the initial image and generate a preliminary segmentation image of the one or more target objects. In some embodiments, the initial image may be down sampled (e.g., from a relatively high original resolution (e.g., 0.5 mm) to a relatively low resolution (e.g., 1.6 mm)) and inputted into the coarse segmentation network, and the preliminary segmentation image may be outputted from the coarse segmentation network. Accordingly, in the subsequent processing, the trained processing model may not process regions beyond the one or more target objects, thereby increasing a segmentation speed of the one or more target objects. The fine segmentation network may be configured to determine a fine image (i.e., the target image) of the one or more target objects. In some embodiments, one or more extracted region(s) (with the original resolution) in the initial image corresponding to the target object(s) in the preliminary segmentation image may be determined. In some embodiments, the extracted region(s) (or pixels or voxels thereof) and the intermediate image may be inputted into the fine segmentation network to generate the fine image (i.e., the target image) of the one or more target objects. In some embodiments, the coarse segmentation network and the fine segmentation network (i.e., the trained processing model) may be determined by training the initial processing model using the plurality of training samples in a training process.

The training process may be performed by the processing device 120 or a processing device different from the processing device 120. The trained processing model may be stored in a storage device (e.g., the storage device 130, the storage 220, or the storage 390). The processing model may be trained online of offline. In some embodiments, the processing model may be trained in an external device, and stored in a storage device (e.g., the storage device 130, the storage 220, the storage 390, or an external storage device that can communicate with the image processing system 100 (e.g., via the network 150)). In some embodiments, the processing device 120a (e.g., the segmentation module 4520) may retrieve the trained processing model from the storage device (e.g., in response to receipt of a request for image segmentation). More descriptions regarding the determination of the trained processing model may be found elsewhere in the present disclosure (e.g., FIG. 7B and the descriptions thereof).

After the initial image and the intermediate image corresponding to the initial image are obtained, the initial image and the intermediate image may be inputted into the trained processing model, and the target image may be generated.

In some embodiments, the target image may include a representation of the one or more target objects without the background. In some embodiments, the processing device 120 may transmit the target image to a terminal (e.g., the terminal(s) 140 in the image processing system 100).

In some embodiments, after the target image is generated, a largest connected domain in the target image may be extracted as an updated target image. Therefore, the representation of the one or more target objects may be reserved, while representations of the interfering objects may be deleted, thereby improving the segmentation accuracy of the target objects.

As described in some embodiments of the present disclosure, the target image may be obtained by obtaining the initial image and the intermediate image corresponding to the initial image, and inputting the initial image and the intermediate image into the trained processing model. In comparison with traditional segmentation techniques (e.g., blood vessel segmentation techniques) that are not suitable for the segmentation of target objects with relatively complicated structures (e.g., coronary arteries), operations illustrated in the process 500 may be performed to segment target objects more precisely, and accordingly, the segmentation accuracy of the target objects using the trained processing model may be improved.

It should be noted that the above descriptions are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, operations 5110 and 5115 may be integrated into a single operation. As another example, one or more other optional operations (e.g., a storing operation) may be added elsewhere in the process 500. In the storing operation, the processing device 120 may store information and/or data (e.g., the initial image, the intermediate image, the trained processing model, etc.) associated with the image processing system 100 in a storage device (e.g., the storage device 130) disclosed elsewhere in the present disclosure.

Figure 6:
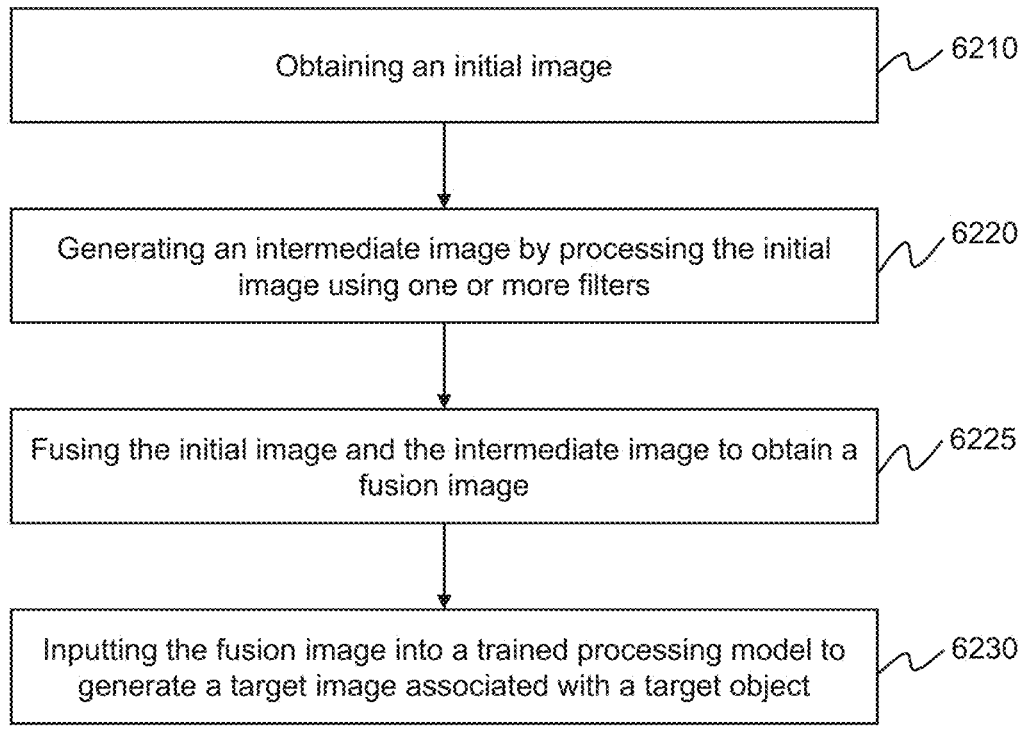
FIG. 6 is a flowchart illustrating an exemplary process for generating a target image associated with one or more target objects according to some embodiments of the present disclosure.

FIG. 6 is a flowchart illustrating an exemplary process for generating a target image associated with one or more target objects according to some embodiments of the present disclosure. The process 600 may include more descriptions of one or more operations in FIG. 5.

In some embodiments, the process 600 may be implemented as a set of instructions (e.g., an application) stored in the storage device 130, storage 220, or storage 390. The processing device 120, the processor 210 and/or the CPU 340 may execute the set of instructions, and when executing the instructions, the processing device 120, the processor 210 and/or the CPU 340 may be configured to perform the process 600. The operations of the illustrated process presented below are intended to be illustrative. In some embodiments, the process 600 may be accomplished with one or more additional operations not described and/or without one or more of the operations discussed. Additionally, the order of the operations of the process 600 illustrated in FIG. 6 and described below is not intended to be limiting. In some embodiments, an operation illustrated in FIG. 5 may be performed according to one or more operations of the process 600. For example, operation 5115 in FIG. 5 may be performed according to operation 6220. As another example, operation 5120 in FIG. 5 may be performed according to operations 6225-6230.

Specifically, in some embodiments, the operation 5120 "generating a target image associated with a target object using a trained processing model" may be illustrated as the operation 6225 "fusing the initial image and the intermediate image to obtain a fusion image," and the operation 6230 "inputting the fusion image into a trained processing model" to clarify the application mechanism of the trained processing model.

Specifically, in some embodiments, the operation 5115 "obtaining an intermediate image corresponding to the initial image" may be illustrated as the operation 6220 "generating an intermediate image by processing the initial image using one or more filters" to clarify the determination mechanism of the intermediate image.

In some embodiments, as shown in FIG. 6, an exemplary target image generation process is provided. The process 600 may include one or more of the following operations.

In 6210, an initial image may be obtained.

In some embodiments, the processing device 120a (e.g., the obtaining module 4510) may perform operation 6210. The initial image may include a plurality of first pixels or voxels representing a subject. The subject may include one or more target objects (e.g., one or more blood vessels (e.g., coronary arteries)). Operation 6210 may be similar to operation 5110. More descriptions regarding the initial image may be found elsewhere in the present disclosure (e.g., FIG. 5 and descriptions thereof).

In 6220, an intermediate image may be generated by processing the initial image using one or more filters.

In some embodiments, the processing device 120a (e.g., the obtaining module 4510) may perform operation 6220. The intermediate image may include a plurality of second pixels or voxels associated with at least a portion of the one or more target objects in the initial image. More descriptions of the intermediate image may be found elsewhere in the present disclosure (e.g., FIG. 5 and descriptions thereof).

In some embodiments, the one or more filters may include a Gaussian filter, a tubular filter, a linear filter, a Wiener filter, a threshold filter, or the like, or any combination thereof.

In some embodiments, to generate the intermediate image by processing the initial image using the one or more filters, a Hessian matrix corresponding to each first pixel or voxel of the initial image may be determined. At least one characteristic value corresponding to the each first pixel of voxel may be determined based on the Hessian matrix. In some embodiments, a response value corresponding to the each first pixel or voxel may be determined by processing the at least one characteristic value corresponding to the each first pixel or voxel using a first filter (e.g., a tubular filter, or a linear filter) of the one or more filters. In some embodiments, the intermediate image may be generated based on a plurality of response values corresponding to the plurality of first pixels or voxels of the initial image.

In some embodiments, because characteristic values of a Hessian matrix corresponding to a pixel or voxel of an image may relate to shape features of the pixel or voxel, each first pixel or voxel of the initial image may be associated with at least one characteristic value of a Hessian matrix corresponding to the each first pixel or voxel. In some embodiments, the at least one characteristic value of the Hessian matrix corresponding to the each first pixel or voxel may be enhanced using a tubular filter (or a linear filter). Therefore, pixel or voxel values of first pixels or voxels representing an object (e.g., a target object) having a tubular shape may be enhanced or increased, while pixel or voxel values of first pixels or voxels representing other objects (e.g., interfering objects) having non-tubular shape may be suppressed or decreased. A response value corresponding to each first pixel or voxel may be determined by enhancing the at least one characteristic value using the tubular filter (or the linear filter), and the intermediate image may be generated based on the plurality of response values corresponding to the plurality of first pixels or voxels of the initial image. For example, the intermediate image may be generated by combining the plurality of response values according to an arrangement order of the plurality of first pixels or voxels in the initial image.

It should be noted that, in some embodiments, before determining the at least one characteristic value of the Hessian matrix corresponding to the each first pixel or voxel, the initial image may be smoothed using a second filter (e.g., a Gaussian filter) of the one or more filters to improve a precision or accuracy of the intermediate image, thereby improving a segmentation accuracy of the trained processing model. In some embodiments, the smoothed initial image may be processed in subsequent operations. For example, the intermediate image may be generated based on the smoothed initial image. The second filter may include a Gaussian filter, a tubular filter, a linear filter, a Wiener filter, a threshold filter, or the like, or any combination thereof.

In some embodiments, in order to improve the precision and/or accuracy of the intermediate image, in the generation of the intermediate image based on the plurality of response values corresponding to the plurality of first pixels or voxels of the initial image, the initial image may be smoothed using two or more second filters (e.g., Gaussian filters with kernels of different sizes) to generate two or more smoothed initial images. In some embodiments, a Hessian matrix corresponding to each pixel or voxel of each of the two or more smoothed initial images may be determined. Accordingly, at least one characteristic value corresponding to the each pixel or voxel of the each smoothed initial image may be determined. Thus, a response value corresponding to the each pixel or voxel of the each smoothed initial image may be determined by enhancing the at least one characteristic value using the first filter of the one or more filters. Accordingly, two or more response values (the number or count of which may be the same as the number or count of the two or more second filters) corresponding to each first pixel or voxel of the initial image may be determined. In some embodiments, a maximum response value corresponding to each first pixel or voxel of the initial image may be selected among the two or more response values corresponding to the each first pixel or voxel. That is, a maximum response value corresponding to a specific first pixel or voxel of the initial image may be selected among the response values corresponding to pixels or voxels (that are at a same position of the specific first pixel or voxel) of the two or more smoothed initial images. In some embodiments, the processing device 120 may generate the intermediate image based on a plurality of maximum response values corresponding to a plurality of first pixels or voxels of the initial image.

Merely by way of example, an initial image may be smoothed by three second filters, and accordingly, three response values (e.g., R1, R2, and R3) corresponding to a first pixel may be determined. The processing device 120 may determine a maximum response value (e.g., R3) as a target response value corresponding to the first pixel.

In some embodiments, in the generation of the intermediate image based on the plurality of response values corresponding to the plurality of first pixels or voxels of the initial image, two or more candidate intermediate images generated based on two or more second filters may be determined. A count or number of pixels or voxels (in each of the two or more candidate intermediate images) whose response values are greater than a threshold may be determined. The processing device 120 may determine a candidate intermediate image (with the largest count or number of pixels or voxels whose response values are greater than the threshold) as the intermediate image.

Merely by way of example, an initial image may be smoothed by three second filters, and accordingly, three smoothed initial images (e.g., S1, S2, S3) may be generated. A candidate intermediate image may be generated based on each of the three smoothed initial images, and accordingly, three candidate intermediate images (e.g., M1 (corresponding to S1), M2 (corresponding to S2), M3 (corresponding to S3)) may be generated. A first count or number of pixels or voxels (in candidate intermediate image M1) whose response values are greater than the threshold may be determined as C1. A second count or number of pixels or voxels (in candidate intermediate image M2) whose response values are greater than the threshold may be determined as C2. A third count or number of pixels or voxels (in candidate intermediate image M3) whose response values are greater than the threshold may be determined as C3. If the largest count or number among C1, C2, and C3 is C2, then the candidate intermediate image M2 may be designated as the intermediate image. The response values of the candidate intermediate image M2 may be regarded as target response values. In some embodiments, for each candidate intermediate image, an average response value of the response values in the candidate intermediate image may be determined, and thus, two or more average response values may be determined corresponding to the two or more candidate intermediate images may be determined. A largest average response value among the two or more average response values may be determined, and a candidate intermediate image that has the largest average response value may be designated as an intermediate image corresponding to the initial image.

In 6225, the initial image and the intermediate image may be fused to obtain a fusion image. In 6230, the fusion image may be inputted into a trained processing model to generate a target image associated with the one or more target objects.

In some embodiments, the processing device 120*a* (e.g., the segmentation module 4520) may perform operation 6225. In some embodiments, the processing device 120*a* (e.g., the segmentation module 4520) may perform operation 6230.

In some embodiments, to generate the target image, the initial image and the intermediate image may be inputted in a parallel mode into two different input channels of the trained processing model. Each of the two input channels may transmit a corresponding input image to the trained processing model.

In some embodiments, to generate the target image, the fusion image may be determined by processing a first value of each of the plurality of first pixels or voxels of the initial image and a second value of a corresponding second pixel or voxel of the intermediate image. For example, a value of a pixel or voxel of the fusion image may be determined based on a sum or product of the first value and the second value. The fusion image may be inputted into the trained processing model to generate the target image.

According to the process 600, the application mechanism of the trained processing model may be optimized. Specifically, the application mechanism may include obtaining the fusion image by fusing the initial image and the intermediate image, and inputting the fusion image into the trained processing model to generate the target image. Moreover, the determination of the intermediate image may be performed by processing the initial image using one or more filters. Therefore, the segmentation of the target objects (e.g., blood vessels) can be facilitated after the obtaining of the initial image, thereby simplifying the input data acquisition process, improving image processing efficiency, and improving the user experience.

It should be noted that the above descriptions are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, operation 6210 and operation 6220 may be combined into a single operation. As another example, one or more other optional operations (e.g., a storing operation) may be added elsewhere in the process 600. In the storing operation, the processing device 120 may store information and/or data (e.g., the initial image, the intermediate image, the trained processing model, etc.) associated with the image processing system 100 in a storage device (e.g., the storage device 130) disclosed elsewhere in the present disclosure.

Figure 7A:
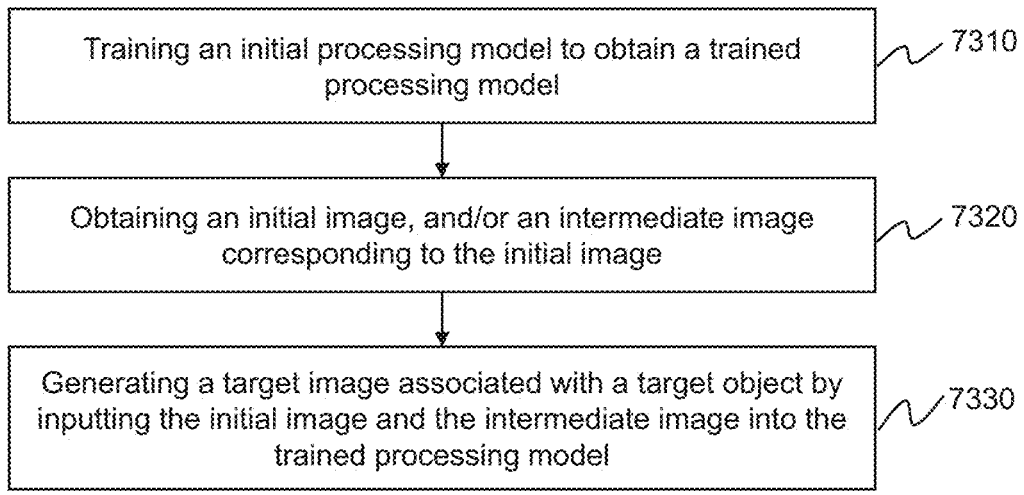
FIG. 7A is a flowchart illustrating an exemplary process for determining a target image associated with one or more target objects according to some embodiments of the present disclosure.

FIG. 7A is a flowchart illustrating an exemplary process for determining a target image associated with one or more target objects according to some embodiments of the present disclosure. The process 700a may include more descriptions of one or more operations in FIGS. 5-6.

In some embodiments, the process 700a may be implemented as a set of instructions (e.g., an application) stored in the storage device 130, storage 220, or storage 390. The processing device 120, the processor 210 and/or the CPU 340 may execute the set of instructions, and when executing the instructions, the processing device 120, the processor 210 and/or the CPU 340 may be configured to perform the process 700a. The operations of the illustrated process presented below are intended to be illustrative. In some embodiments, the process 700a may be accomplished with one or more additional operations not described and/or without one or more of the operations discussed. Additionally, the order of the operations of process 700a illustrated in FIG. 7A and described below is not intended to be limiting. In some embodiments, one or more operations (e.g., 7320-7330) in process 700a may be performed by the processing device 120a. In some embodiments, one or more operations (e.g., 7310) in process 700a may be performed by the processing device 120b or an external processing device associated with the image processing system 100. For example, operation 7310 in process 700a may be performed by a processing device of a vendor who provides and/or maintains such a processing model (e.g., a manufacturer of the imaging device 110). As another example, operations 7320-7330 in process 700a may be performed by a processing device of a client of the vendor.

In some embodiments, before operation 5120 "generating a target image associated with a target object using a trained processing model," an additional operation 7310 "training an initial processing model to obtain a trained processing model" may be added. In some embodiments, the operation 7310 "training an initial processing model to obtain a trained processing model" may include operations "determining a plurality of intermediate sample images based on a plurality of initial sample images; determining a predicted image by inputting each of the plurality of initial sample images and a corresponding intermediate sample image into the initial processing model; and adjusting or updating one or more parameters of the initial processing model based on a difference between each of the plurality of predicted images and a corresponding reference image." The operations may be performed to improve the training effect of the initial processing model.

In some embodiments, as shown in FIG. 7A, an exemplary target image generation process is provided. The process 700a may include one or more of the following operations.

In 7310, an initial processing model may be trained to obtain a trained processing model.

In some embodiments, the processing device 120a (e.g., the training module 4530) or the processing device 120b may perform operation 7310. More descriptions of the training process of the initial processing model may be found elsewhere in the present disclosure (e.g., FIG. 7B and descriptions thereof).

In 7320, an initial image and/or an intermediate image corresponding to the initial image may be obtained.

In some embodiments, the processing device 120a (e.g., the obtaining module 4510) may perform operation 7320. Operation 7320 may be similar to operations 5110, 5115, 6210, 6220, and 8410-8455. More descriptions about the obtaining of the initial image and the intermediate image may be found elsewhere in the present disclosure (e.g., FIGS. 5, 6, and 8 and the descriptions thereof).

In 7330, a target image associated with one or more target objects may be generated by inputting the initial image and the intermediate image into the trained processing model.

In some embodiments, the processing device 120a (e.g., the segmentation module 4520) may perform operation 7330. Operation 7330 may be similar to operations 5120, 6225-6230, and 8460. More descriptions of the generation of the target image may be found elsewhere in the present disclosure (e.g., FIGS. 5, 6, and 8 and the descriptions thereof).

In some embodiments, operation 7310 may be performed before or after operation 7320. The order of operations 7310 and 7320 of the process 700a illustrated in FIG. 7A is not intended to be limiting.

In some embodiments, the initial image and the intermediate image may be used as training samples to update the trained processing model.

It should be noted that the above descriptions are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, operation 7320 and operation 7330 may be combined into a single operation. As another example, one or more other optional operations (e.g., a storing operation) may be added elsewhere in the process 700a. In the storing operation, the processing device 120 may store information and/or data (e.g., the initial image, the intermediate image, the trained processing model, etc.) associated with the image processing system 100 in a storage device (e.g., the storage device 130) disclosed elsewhere in the present disclosure.

Figure 7B:
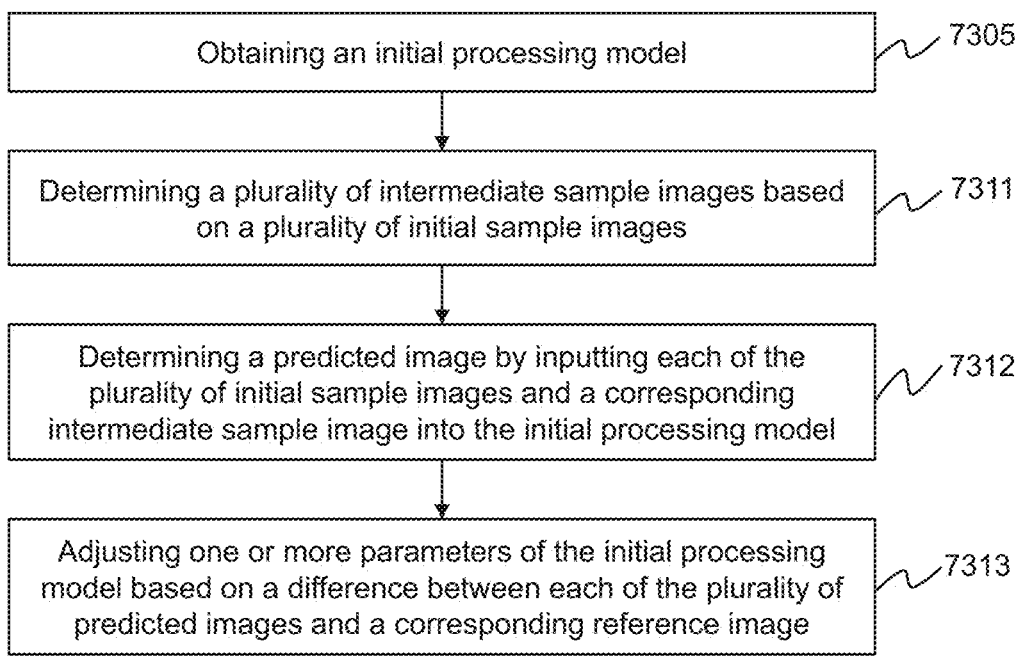
FIG. 7B is a flowchart illustrating an exemplary process for training a processing model according to some embodiments of the present disclosure.

FIG. 7B is a flowchart illustrating an exemplary process for training a processing model according to some embodiments of the present disclosure. In some embodiments, as shown in FIG. 7B, an exemplary model training process is provided. The process 700b may include one or more of the following operations.

In some embodiments, the process 700b may be implemented as a set of instructions (e.g., an application) stored in the storage device 130, storage 220, or storage 390. The processing device 120, the processor 210 and/or the CPU 340 may execute the set of instructions, and when executing the instructions, the processing device 120, the processor 210 and/or the CPU 340 may be configured to perform the process 700b. The operations of the illustrated process presented below are intended to be illustrative. In some embodiments, the process 700b may be accomplished with one or more additional operations not described and/or without one or more of the operations discussed. Additionally, the order of the operations of process 700b illustrated in FIG. 7B and described below is not intended to be limiting. In some embodiments, the trained processing model described elsewhere in the present disclosure (e.g., operation 5120 in FIG. 5, operation 6230 in FIG. 6, operation 7330 in FIG. 7A, operation 8460 in FIG. 8) may be obtained according to the process 700b. In some embodiments, the process 700b may be performed by the processing device 120b. In some embodiments, the process 700b may be performed by another processing device or a system other than the image processing system 100, e.g., a processing device or system of a vendor of a manufacturer. In the following descriptions, one or more operations of process 700b performed by the processing device 120b are merely provided for the purposes of illustration, and not intended to limit the scope of the present disclosure.

In 7305, an initial processing model may be obtained. In some embodiments, the processing device 120b (e.g., the initial sample image obtaining unit 410) may perform operation 7305.

In some embodiments, the initial processing model may include a convolutional neural network (CNN) model (e.g., a U-Net neural network model, or a V-Net neural network model), a deep CNN (DCNN) model, a fully convolutional network (FCN) model, a recurrent neural network (RNN) model, or the like, or any combination thereof. In some embodiments, the initial processing model may be stored in one or more storage devices (e.g., the storage device 130, the storage 220, and/or the storage 390) associated with the image processing system 100 and/or an external data source. Accordingly, the initial processing model may be retrieved from the storage devices and/or the external data source.

In some embodiments, the processing device 120b may perform a plurality of iterations to iteratively update one or more parameter values of the initial processing model. Before the plurality of iterations, the processing device 120b may initialize the parameter values of the initial processing model. Exemplary parameters of the initial processing model may include the size of a kernel of a layer, the total count (or number) of layers, the count (or number) of nodes in each layer, a learning rate, a batch size, an epoch, a connected weight between two connected nodes, a bias vector relating to a node, etc. In some embodiments, the one or more parameters may be set randomly. In some embodiments, the one or more parameters may be set to one or more certain values, e.g., 0, 1, or the like. In some embodiments, the parameter values of the initial processing model may be initialized based on a Gaussian random algorithm, a Xavier algorithm, etc.

In 7311, a plurality of intermediate sample images may be determined based on a plurality of initial sample images. Each of the plurality of intermediate sample images may correspond to one of the plurality of initial sample images.

In some embodiments, operation 7311 may be performed by the processing device 120b (e.g., the intermediate sample image determination unit 420). In some embodiments, the trained processing model may be obtained by training the initial processing model in a training process based on a plurality of training samples. The initial sample images and the corresponding intermediate sample images may be used as input of the initial processing model in the training process of the initial processing model.

The plurality of training samples may include a plurality of initial sample images and a plurality of intermediate sample images corresponding to the plurality of initial sample images. The plurality of training samples may associate with a sample organ or tissue. The training samples may include one or more sample objects with a shape similar to or the same as the target objects. For example, if the target objects include blood vessels, the training samples may include sample objects with a linear shape. In some embodiments, an initial sample image may correspond to a subject including one or more target objects, (e.g., a subject as described elsewhere in the present disclosure (e.g., FIG. 5 and the descriptions thereof)). The initial sample image may include a representation of the subject, and the corresponding intermediate sample image may include a coarse representation of the target objects. For example, the initial sample image may include a representation of the heart, and the intermediate sample image may include a coarse representation of one or more coronary arteries of the heart. In some embodiments, the plurality of initial sample images may correspond to a same or similar type of subject (e.g., the heart), and the plurality of intermediate sample images may correspond to a same or similar type of target objects (e.g., the coronary arteries).

In some embodiments, the initial sample images may include CT images, MR images, DSA images, PET images, SPECT images, DR images, or the like.

In some embodiments, the plurality of training samples used to train the initial processing model may correspond to a same type of target object (e.g., a coronary artery), and a trained processing model corresponding to the type of target object may be determined. Therefore, the trained processing model may be targetedly used to segment the same type of target object, thereby improving the segmentation accuracy of this type of target object. For example, a coronary artery segmentation model may be trained using a plurality of coronary artery sample images. As another example, a choroidal blood vessel segmentation model may be trained using a plurality of choroidal blood vessel sample images. As a further example, a hepatic vein segmentation model may be trained using a plurality of hepatic vein sample images.

In some embodiments, to determine the plurality of intermediate sample images, one or more filters may be used to process the plurality of initial sample images. In some embodiments, the one or more filters may include a Gaussian filter, a tubular filter, a linear filter, a Wiener filter, a threshold filter, or the like, or any combination thereof.

In some embodiments, to determine an intermediate sample image by processing an initial sample image based on the one or more filters, a Hessian matrix corresponding to each pixel or voxel of the initial sample image may be determined, and at least one characteristic value corresponding to the each pixel or voxel may be determined based on the Hessian matrix. A response value corresponding to the each pixel or voxel may be determined by enhancing the at least one characteristic value corresponding to the each pixel or voxel using a first filter (e.g., a tubular filter or a linear filter) of the one or more filters. The intermediate sample image may be generated based on a plurality of response values corresponding to a plurality of pixels or voxels of the initial sample image.

In some embodiments, before determining the at least one characteristic value of the Hessian matrix corresponding to the each pixel or voxel, the initial sample image may be smoothed using a second filter (e.g., a Gaussian filter) of the one or more filters to improve a precision and/or accuracy of the intermediate sample image, thereby improving a segmentation accuracy of the trained processing model. The intermediate sample image may be generated based on the smoothed initial sample image. The second filter may include a Gaussian filter, a tubular filter, a linear filter, a Wiener filter, a threshold filter, or the like, or any combination thereof.

In some embodiments, in order to improve the precision and/or accuracy of the intermediate sample image, in the generation of the intermediate sample image based on the plurality of response values corresponding to the plurality of pixels or voxels of the initial sample image, the initial sample image may be smoothed using two or more second filters (e.g., Gaussian filters with kernels of different sizes) to generate two or more smoothed initial sample images. Accordingly, two or more candidate intermediate sample images may be generated based on the two or more smoothed initial sample images, respectively. For each candidate intermediate sample image, an average response value of the response values in the candidate intermediate sample image may be determined, and thus, two or more average response values may be determined corresponding to the two or more candidate intermediate sample images may be determined. A largest average response value among the two or more average response values may be determined, and a candidate intermediate sample image that has the largest average response value may be designated as an intermediate sample image corresponding to the initial sample image.

Merely by way of example, an initial sample image may be smoothed by three second filters, and accordingly, three smoothed initial sample images (e.g., SS1, SS2, SS3) may be generated. A candidate intermediate sample image may be generated based on each of the three smoothed initial sample images, and accordingly, three candidate intermediate sample images (e.g., MS1 (corresponding to SS1), MS2 (corresponding to SS2), MS3 (corresponding to SS3)) may be generated. A first average response value of the response values in the candidate intermediate sample image MS1 may be determined as AR1. A second average response value of the response values in the candidate intermediate sample image MS2 may be determined as AR2. A third average response value of the response values in the candidate intermediate sample image MS3 may be determined as AR3. If the largest average response value among AR1, AR2, and AR3 is AR1, then the candidate intermediate sample image MS1 may be designated as the intermediate sample image corresponding to the initial sample image.

It should be noted that the generation of the intermediate sample images based on the initial sample images may be similar to or the same as the generation of the intermediate image based on the initial images as described in connection with operation 6220 as illustrated in FIG. 6 (or according to one or more operations in process 800 as described in FIG. 8).

In some embodiments, in order to improve an accuracy or precision the trained processing model for generating a target image associated with the one or more target objects, the generation of the intermediate images may be the same as the generation of the intermediate sample images.

In 7312, a predicted image may be determined (e.g., in a current iteration) by inputting one (e.g., each) of the plurality of initial sample images and a corresponding intermediate sample image into the initial processing model.

In some embodiments, operation 7312 may be performed by the processing device 120b (e.g., the predicted image determination unit 430).

Specifically, in some embodiments, at least one of the plurality of initial sample images and the corresponding intermediate sample image may be used as at least one training sample. A plurality of training samples may be inputted into the initial processing model and a plurality of predicted images may be outputted from the initial processing model.

In some embodiments, each of the plurality of initial sample images and the corresponding intermediate sample image may be fused to determine a fusion sample image, and the fusion sample image may be inputted into the initial processing model to train the initial processing model.

In some embodiments, each of the plurality of initial sample images and the corresponding intermediate sample image may be inputted in a parallel mode into two different input channels of the initial processing model. Alternatively, or additionally, the fusion sample image may be determined based on a sum or product of a first pixel or voxel value of each pixel or voxel in the initial sample image and a second pixel or voxel value of each pixel or voxel in the corresponding intermediate sample image. The fusion sample image may be inputted into the initial processing model to train the initial processing model.

In some embodiments, in order to improve an accuracy or precision of the trained processing model for generating the target image associated with the one or more target objects, the fusion operation of the initial image and the intermediate image as described in FIG. 6 may be the same as the fusion operation of the initial sample image and the intermediate sample image performed in the training process of the processing model.

Merely by way of example, if the initial sample image and the intermediate sample image are inputted in a parallel mode into two different input channels of the initial processing model in the training process of the processing model, then in the generation of the target image (e.g., in FIG. 6), the initial image and the intermediate image may be inputted in a parallel mode into two different input channels of the trained processing model. As another example, if the initial sample image and the intermediate sample image are fused as a fusion sample image, and the fusion sample image is inputted into the initial processing model to train the initial processing model, then in the generation of the target image (e.g., in FIG. 6), the initial image and the intermediate image may be fused as a fusion image and the fusion image may be inputted into the trained processing model.

In 7313, one or more parameters of the initial processing model may be adjusted and/or updated based on a difference between each of the plurality of predicted images and a corresponding reference image.

In some embodiments, a trained processing model may be determined based on the one or more updated parameters. In some embodiments, operation 7313 may be performed by the processing device 120b (e.g., the parameter adjustment unit 440).

In some embodiments, the corresponding reference image may refer to a desired target image corresponding to the each of the plurality of initial sample images. In some embodiments, the processing device 120*b* may obtain a plurality of reference images corresponding to the initial sample images from a storage device (e.g., the storage device 130, the storage 220, the storage 390, or an external data source, or the like). In some embodiments, the reference images may be generated based on initial sample images using one or more processing algorithms (e.g., a segmentation algorithm), and/or labelled or verified manually by a user of the image processing system 100. In some embodiments, a predicted image corresponding to an initial sample image may be compared with a reference image corresponding to the initial sample image, and a difference between the reference image and the predicted image may be determined. In some embodiments, an accuracy of the processing model in the current iteration may be determined based on the difference. If the accuracy satisfies a predetermined accuracy threshold, it may be determined that the processing model in the current iteration is sufficiently trained, and the training process may be terminated. If the accuracy does not satisfy the predetermined accuracy threshold, the one or more parameters of the processing model in the current iteration may be adjusted and/or updated based on the difference between the reference image and the predicted image to decrease the difference. In some embodiments, the parameters of the processing model may be adjusted and/or updated in a plurality of iterations until the accuracy satisfies the predetermined accuracy threshold.

In some embodiments, the reference images may be medical gold standard images corresponding to the initial sample images. The predetermined accuracy threshold may be set according to a default setting of the image processing system 100 or preset by a user or operator via the terminals(s) 140. In some embodiments, the predetermined accuracy threshold may be set according to an empirical value.

In some embodiments, the accuracy of the processing model in the current iteration may be determined based on a cost function. The cost function may include a log loss function, a cross-entropy loss function, a least-squares function, an index loss function, etc. In some embodiments, a plurality of iterations may be performed to update the one or more parameters of the processing model until a termination condition is satisfied. The termination condition may provide an indication of whether the initial processing model is sufficiently trained. The termination condition may relate to the cost function or an iteration count of the training process. For example, the termination condition may be satisfied if the value of the cost function (e.g., the accuracy) of the processing model is minimal or smaller than a threshold (e.g., a constant). As another example, the termination condition may be satisfied if the value of the cost function converges. The convergence may be deemed to have occurred if the variation of the values of the cost function in two or more consecutive iterations is smaller than a threshold (e.g., a constant). As a further example, the termination condition may be satisfied when a specified number (or count) of iterations are performed in the training process. As illustrated above, if the termination condition is not satisfied (e.g., if the accuracy does not satisfy the predetermined accuracy threshold), in next iteration(s), other training sample(s) may be inputted into the processing model to train the processing model as described above, until the termination condition is satisfied. The trained processing model may be determined based on the one or more updated parameters. In some embodiments, the trained processing model may be transmitted to the storage device 130, or any other storage device for storage.

In the present disclosure, to obtain the trained processing model, the plurality of intermediate sample images may be determined based on the plurality of initial sample images, and the plurality of initial sample images and the corresponding intermediate sample images may be inputted into the processing model to obtain a plurality of predicted images corresponding to the plurality of initial sample images. The one or more parameters of the processing model may be adjusted and/or updated based on the differences between the plurality of predicted images and the corresponding reference images. According to the training process illustrated above, the training mechanism of the processing model may be clarified, and an effective segmentation of target objects in an initial image may be realized using the trained processing model, thereby improving the segmentation accuracy of the target objects (e.g., blood vessels).

In some embodiments, the initial processing model may include two different stages. If an image is input into a stage of a network, an input channel may be formed. Each stage may correspond to a segmentation network. For example, a first stage of the initial processing model may correspond to an initial coarse segmentation network, and a second stage of the initial processing model may correspond to an initial fine segmentation network. In some embodiments, as described in FIG. 5, the trained processing model may include a coarse segmentation network and/or a fine segmentation network. In some embodiments, the coarse segmentation network and the fine segmentation network may be determined by training two initial processing models in two training processes, respectively. For example, the initial coarse segmentation network may be trained using initial sample images in a first training process. As another example, the initial fine segmentation network may be trained using intermediate sample images and extracted regions (or pixels or voxels thereof) in the initial sample images corresponding to the target objects in the preliminary segmentation images in a second training process. The two training processes may be performed in a same processing device or different processing devices. For example, the coarse segmentation network may be determined in a first processing device (e.g., the processing device 120), while the fine segmentation network may be determined in a second processing device (e.g., a processing device of a vendor of the processing model). As another example, a specific processing device may first determine the coarse segmentation network, and then determine the fine segmentation network. The trained processing model may be determined (or obtained, retrieved) based on the coarse segmentation network and the fine segmentation network.

It should be noted that, the training processes for training the initial coarse segmentation network and/or the initial fine segmentation network may be the same as or similar to the training process for training the initial processing model. For example, an initial sample image may be inputted into the initial coarse segmentation network. A predicted preliminary segmentation image may be output by the initial coarse segmentation network. One or more parameters of the initial coarse segmentation network may be adjusted and/or updated based on a difference between the predicted preliminary segmentation image and a corresponding desired preliminary segmentation image, until a termination condition is satisfied. The coarse segmentation network may be determined based on updated parameters. As another example, an intermediate sample image and extracted region(s) (or pixels or voxels thereof) in an initial sample image corresponding to the target object(s) in a corresponding preliminary segmentation image may be inputted into the initial fine segmentation network. A predicted image may be output by the initial fine segmentation network. One or more parameters of the initial fine segmentation network may be adjusted and/or updated based on a difference between the predicted image and a corresponding desired target image, until a termination condition is satisfied. The fine segmentation network may be determined based on updated parameters. In some embodiments, the termination conditions for training the coarse segmentation network and/or training the fine segmentation network may be similar to the termination condition for training the processing model.

In some alternative embodiments, the initial coarse segmentation network and the initial fine segmentation network may be trained jointly in a single training process. For example, the initial sample images may be inputted into the initial coarse segmentation network, and the intermediate sample images may be inputted into the initial fine segmentation network. The initial processing model (i.e., the initial coarse segmentation network and the initial fine segmentation network) may process the input images (e.g., the initial sample images, the intermediate sample images). In some embodiments, the initial processing model may extract one or more image features (e.g., a low-level feature (e.g., an edge feature, a texture feature), a high-level feature (e.g., a semantic feature), or a complicated feature (e.g., a deep hierarchical feature) included in the inputted images. Based on the extracted image features, the initial processing model may determine the predicted images corresponding to the inputted images. The parameters of the initial processing model may be adjusted and/or updated based on differences between the predicted images and corresponding reference images, until a termination condition is satisfied. The trained processing model (i.e., the coarse segmentation network and the fine segmentation network) may be determined based on the updated parameters.

The trained processing model may include two different stages. The first stage of the trained processing model may correspond to the coarse segmentation network, and the second stage of the trained processing model may correspond to the fine segmentation network. In some embodiments, the coarse segmentation network may include one input channel, initial images may be inputted into the input channel, and preliminary segmentation images may be outputted from the output channel of the coarse segmentation network. In some embodiments, the fine segmentation network may include two input channels, the extracted region(s) (or pixels or voxels thereof) in the initial images corresponding to the target object(s) in the preliminary segmentation images and the intermediate images may be inputted into the two input channels, respectively, and target images may be outputted from the fine segmentation network. In some embodiments, the output of the coarse segmentation network may be input in the fine segmentation network.

It should be noted that the above descriptions are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, the operation 7312 and the operation 7313 may be combined into a single operation to update the parameters of the processing model. As another example, one or more other optional operations (e.g., a storing operation) may be added elsewhere in the process 700b. In the storing operation, the processing device 120b may store information and/or data (e.g., the initial sample images, the intermediate sample images, the desired target images, the parameters, etc.) associated with the image processing system 100 in a storage device (e.g., the storage device 130) disclosed elsewhere in the present disclosure.

Figure 8:
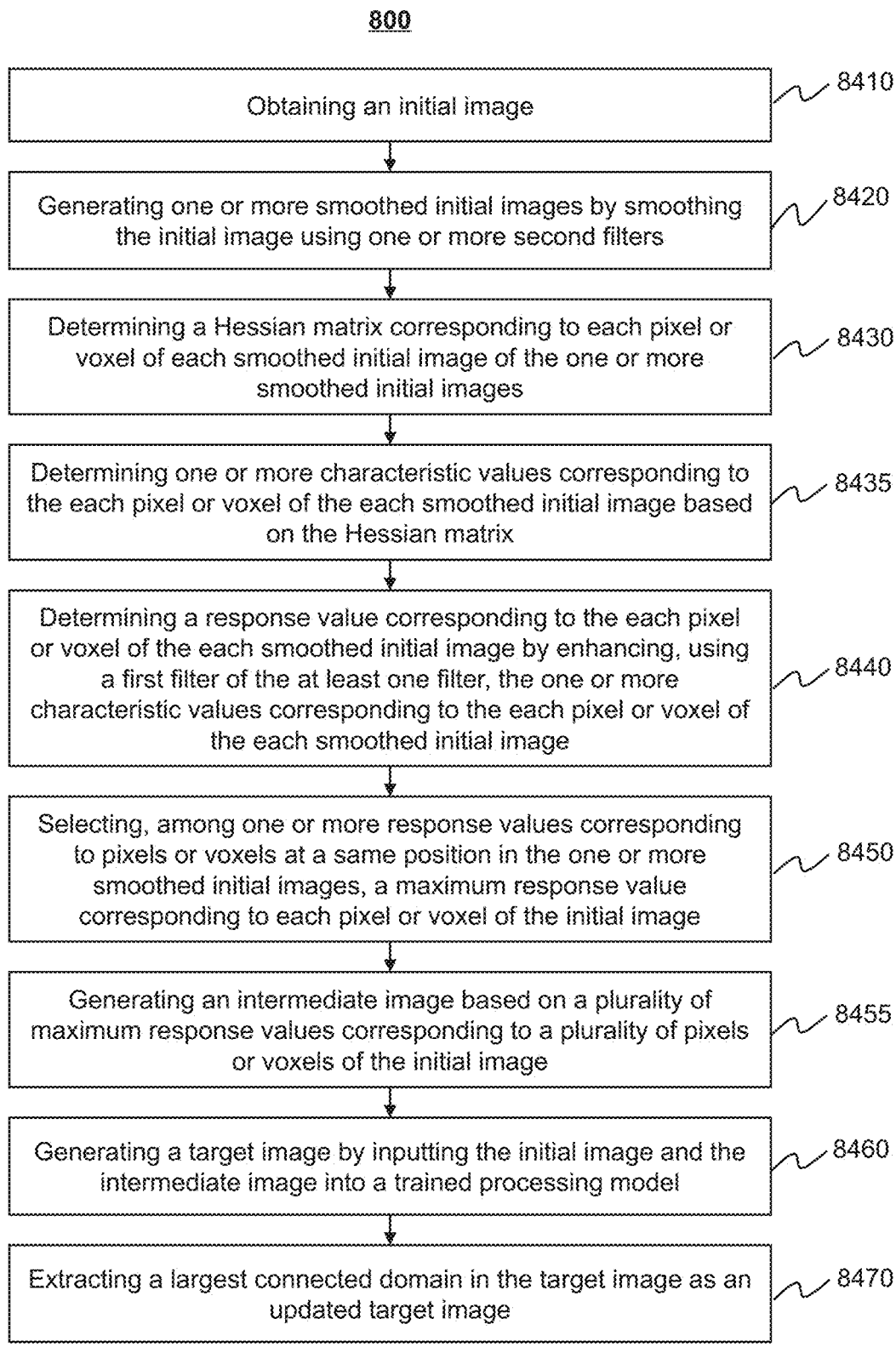
FIG. 8 is a flowchart illustrating an exemplary process for determining a target image associated with one or more target objects according to some embodiments of the present disclosure.

FIG. 8 is a flowchart illustrating an exemplary process for determining a target image associated with one or more target objects according to some embodiments of the present disclosure. In some embodiments, for illustration purpose, a process for segmenting a plurality of blood vessels (e.g., a coronary artery) from a heart CT image is taken as an example in the following descriptions.

In some embodiments, the process 800 may be implemented as a set of instructions (e.g., an application) stored in the storage device 130, storage 220, or storage 390. The processing device 120, the processor 210 and/or the CPU 340 may execute the set of instructions, and when executing the instructions, the processing device 120, the processor 210 and/or the CPU 340 may be configured to perform the process 800. The operations of the illustrated process presented below are intended to be illustrative. In some embodiments, the process 800 may be accomplished with one or more additional operations not described and/or without one or more of the operations discussed. Additionally, the order of the operations of process 800 illustrated in FIG. 8 and described below is not intended to be limiting. In some embodiments, the intermediate image (or intermediate sample image) described elsewhere in the present disclosure (e.g., operation 5115 illustrated in FIG. 5, operation 6220 illustrated in FIG. 6, and/or operation 7311 illustrated in FIG. 7B) may be obtained according to one or more operations (e.g., 8420-8455) in the process 800.

In some embodiments, as shown in FIG. 8, an exemplary blood vessel image segmentation process is provided. The process 800 may include one or more of the following operations.

In 8410, an initial image may be obtained. In some embodiments, the initial image may be a heart CT image as shown in FIG. 11A.

In some embodiments, operation 8410 may be performed by the processing device 120a (e.g., the obtaining module 4510). The initial image may include representations of one or more target objects (e.g., a coronary artery) and a plurality of interfering objects. More descriptions of the initial image and the obtaining of the initial image may be found elsewhere in the present disclosure (e.g., FIG. 5 and descriptions thereof).

In 8420, one or more smoothed initial images may be generated by smoothing the initial image using one or more second filters.

In some embodiments, operation 8420 may be performed by the processing device 120a (e.g., the obtaining module 4510). In some embodiments, the one or more second filters may include a Gaussian, a linear filter, a Wiener filter, a threshold filter, or the like, or any combination thereof.

In some embodiments, the one or more second filters may include filters with kernels of different sizes. For example, the one or more second filters may include Gaussian filters with kernels of different sizes, such as 2×2, 3×3, 4×4, 5×5, 6×6, 7×7, 8×8, 9×9, etc. In some embodiments, the initial image may be smoothed using the one or more Gaussian filters to generate the one or more smoothed initial images. In some embodiments, by smoothing the initial image using the one or more Gaussian filters, a sensitivity of data associated with the initial image (e.g., data of Hessian matrixes described in operation 8430, data of an intermediate image described in operation 8460, etc.) to Gaussian noises may be reduced or eliminated in the subsequent processing operations. The one or more Gaussian filters with kernels of different sizes may be adapted to different sizes of the one or more target objects. In some embodiments, if the initial image includes a representation of a blood vessel, the one or more target objects may refer to different portions of the blood vessel to be segmented from the initial image.

As used herein, the one or more Gaussian filters are adapted to different sizes of the one or more target objects may refer that a specific filter of the one or more Gaussian filters may have a good sensitivity and/or a good specificity in processing a specific target object of a specific size in the one or more target objects. In some embodiments, if the initial image is a 3D image, the initial image may be smoothed (e.g., sequentially) using three Gaussian filters with kernels of different sizes (e.g., 3×3, 5×5, 7×7) in three different directions (e.g., an X-axis direction, a Y-axis direction, and a Z-axis direction) of the initial image, and a corresponding 3D smoothed initial image may be generated.

In 8430, a Hessian matrix corresponding to each pixel or voxel of each smoothed initial image of the one or more smoothed initial images may be determined. In 8435, one or more characteristic values corresponding to the each pixel or voxel of the each smoothed initial image may be determined (e.g., using the Jacobi algorithm) based on the Hessian matrix.

In some embodiments, operation 8430 may be performed by the processing device 120a (e.g., the obtaining module 4510). In some embodiments, operation 8435 may be performed by the processing device 120a (e.g., the obtaining module 4510). In some embodiments, the at least one characteristic value corresponding to the each pixel or voxel of the each smoothed initial image may be determined based on one or more algorithms. For example, the at least one characteristic value may be determined using the Jacobi algorithm. As another example, the at least one characteristic value may be determined using an iterative technique of diagonalizing the Hessian matrix. As a further example, the at least one characteristic value may be analytically determined by directly solving the relationship Hu=λu, in which H is the Hessian matrix, u is an eigenvector of the Hessian matrix, and λ is an characteristic value associated with u.

In some embodiments, if a smoothed initial image is a 3D image, each voxel of the 3D smoothed initial image may correspond to three characteristic values.

In some embodiments, if a smoothed initial image is a 2D image, each pixel of the 2D smoothed initial image may correspond to two characteristic values.

In 8440, a response value corresponding to the each pixel or voxel of the each smoothed initial image may be determined by enhancing the one or more characteristic values corresponding to the each pixel or voxel of the each smoothed initial image using a first filter.

In some embodiments, operation 8440 may be performed by the processing device 120a (e.g., the obtaining module 4510). In some embodiments, the first filter may be selected based on shape characteristics of the one or more target objects. For example, if the one or more target objects have a linear shape, the first filter may include a tubular filter, a linear filter, etc. If the one or more target objects have a dot shape, the first filter may include a dot filter. In some embodiments, a tubular filter (or a linear filter) may be selected as the first filter for blood vessel segmentation.

Using the tubular filter, a specific response value corresponding to a specific pixel or voxel of a smoothed initial image located inside a region of the target objects (e.g., blood vessels) may be greater than another specific response value corresponding to another specific pixel or voxel of the smoothed initial image that is located outside the region of the target objects. In some embodiments, at least a portion of the interfering objects represented in the smoothed initial images (or the initial images) may be deleted or removed by adjusting or setting a suitable bandwidth of the tubular filter.

In some embodiments, the bandwidth of the tubular filter may be set based on a size range of the one or more target objects. For example, if a minimum size of a target object is 1 millimeter and a maximum size of the target object is 6 millimeters, then the bandwidth of the tubular filter may be set as 1 millimeter to 6 millimeters. In some embodiments, the bandwidth of the tubular filter may be set according to a default setting of the image processing system 100 or preset by a user or operator via the terminals(s) 140.

In some embodiments, for a 3D smoothed initial image, a response value corresponding to a pixel or voxel of the 3D smoothed initial image may be determined according to Equation (1) as follows:

$$F = \frac{|a_2| \times (|a_2| - |a_3|)}{|a_1|} \times \sigma^2, \quad (1)$$

where $a_1$, $a_2$, and $a_3$ refer to the three characteristic values corresponding to the pixel or voxel, respectively; F refers to the response value corresponding to the pixel or voxel; and a refers to the bandwidth of the first filter.

In 8450, a maximum response value corresponding to each pixel or voxel of the initial image may be selected among one or more response values corresponding to pixels or voxels at a same position in the one or more smoothed initial images. In 8455, an intermediate image may be generated based on a plurality of maximum response values corresponding to a plurality of pixels or voxels of the initial image.

In some embodiments, operation 8450 may be performed by the processing device 120a (e.g., the obtaining module 4510). In some embodiments, operation 8455 may be performed by the processing device 120a (e.g., the obtaining module 4510).

An exemplary intermediate image may be shown in FIG. 11B. Because response values corresponding to pixels or voxels of at least a portion of the interfering objects in the intermediate image are smaller than response values corresponding to pixels or voxels of the target objects, pixels or voxels of the at least a portion of the interfering objects may have relatively low brightness, while pixels or voxels of the one or more target objects may have relatively high brightness. In some embodiments, due to a limitation of the first filter (e.g., the tubular filter), the intermediate image may also include representations of a portion of the interfering objects. For example, as shown in FIG. 11B, the intermediate image may have representations of one or more bones, a trachea, one or more blood vessels other than the coronary artery, etc.

In 8460, the initial image and the intermediate image may be used as input images and may be inputted into a trained processing model to generate a target image associated with the one or more target objects. The trained processing model may be obtained by training an initial processing model in a training process. The processing model may include a convolutional neural network (CNN) model (e.g., a U-Net neural network model, or a V-Net neural network model), a deep CNN (DCNN) model, a fully convolutional network (FCN) model, a recurrent neural network (RNN) model, or the like, or any combination thereof.

Figure 9:
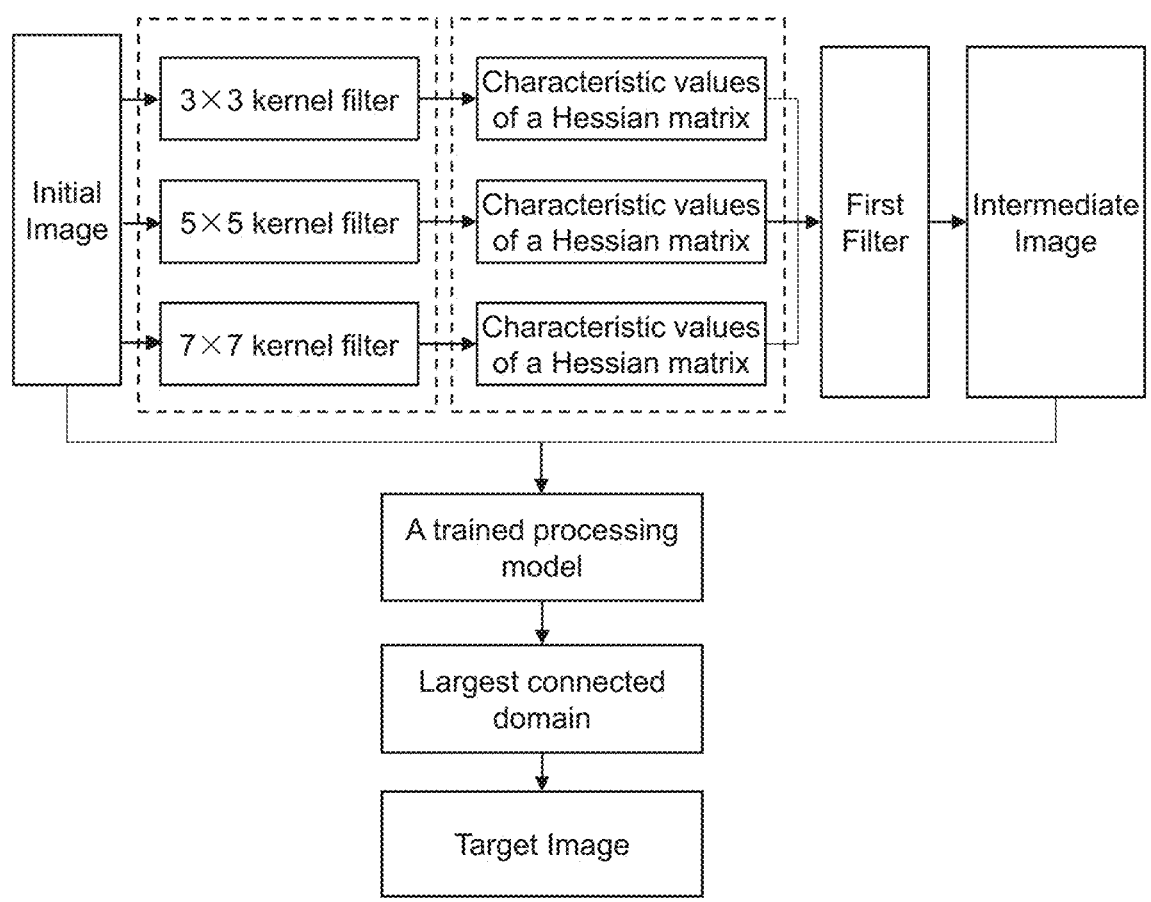
FIG. 9 is a diagram illustrating an exemplary process for generating an intermediate image and a target image according to some embodiments of the present disclosure.

More descriptions of the application of the trained processing mode may be found elsewhere in the present disclosure (e.g., FIG. 9 and descriptions thereof). The processing model may include at least two input channels. A first input channel may be configured to input the initial (sample) image(s), and a second input channel may be configured to input the intermediate (sample) image(s). In the training process of the processing model, the processing model may learn rich features from the initial sample images and the intermediate sample images, thereby reducing learning difficulty, and improving learning efficiency. In addition, because a plurality of interfering objects are substantially removed from the intermediate sample images, effective prior knowledge (or information) can be introduced in the training process of the processing model, thereby improving an accuracy of the trained processing model.

In some embodiments, operation 8460 may be performed by the processing device 120a (e.g., the segmentation module 4520). In some embodiments, the trained processing model may accordingly include a coarse segmentation network and a fine segmentation network. In some embodiments, the initial image and the intermediate image may be inputted in a parallel mode into two different input channels of the trained processing model to generate the target image. For example, the initial image may be inputted into to the coarse segmentation network, and the intermediate image may be inputted into the fine segmentation network. In some embodiments, the processing device 120 may fuse the initial image and the intermediate image to obtain a fusion image. The processing device 120 may input the fusion image into the trained processing model to generate the target image. More descriptions for determining the target image based on the fusion image may be found elsewhere in the present disclosure (e.g., FIG. 6 and the descriptions thereof).

In some embodiments, a largest connected domain in a preliminary segmentation image generated from the coarse segmentation network may be extracted as an updated preliminary segmentation image. In some embodiments, one or more updated extracted region(s) (with the original resolution) in the initial image corresponding to the target object(s) in the updated preliminary segmentation image may be determined. The updated extracted region(s) (or pixels or voxels thereof) and the intermediate image may be inputted into the fine segmentation network to generate the target image.

For illustration purposes, an exemplary target image generated according to the operations illustrated above may be shown in FIG. 12A. An exemplary segmentation result generated based on a heart image rather than an intermediate image may be shown in FIG. 12A. An exemplary medical gold standard image may be shown in FIG. 12A.

In 8470, a largest connected domain in the target image may be extracted as an updated target image.

In some embodiments, operation 8470 may be performed by the processing device 120a (e.g., the segmentation module 4520).

Figure 12A:
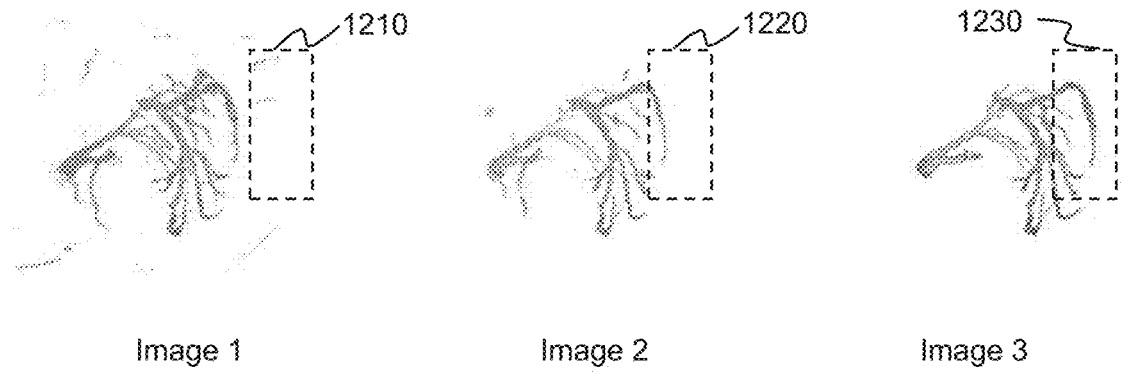
FIG. 12A shows an exemplary image generated based on a single source model, an exemplary image generated based on a multi-source model, and an exemplary gold standard image according to some embodiments of the present disclosure.
Figure 12B:
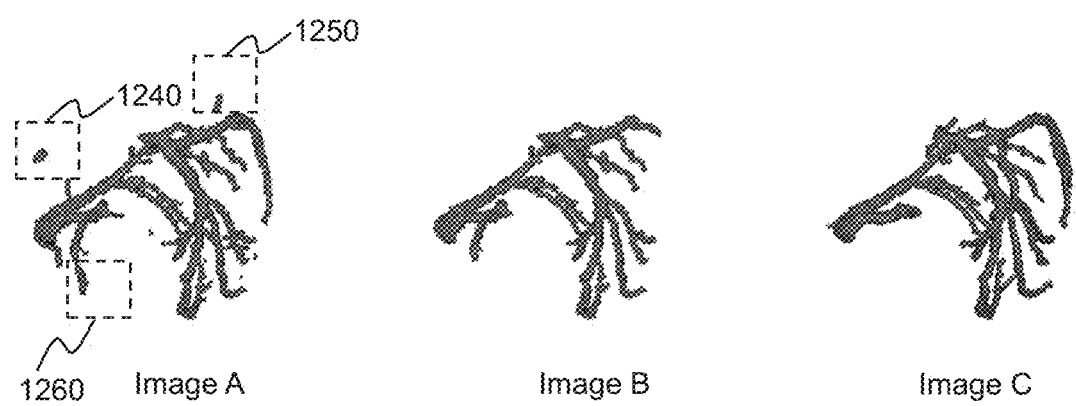
FIG. 12B shows an exemplary image generated without extracting a largest connected domain, an exemplary image generated with extracting the largest connected domain, and an exemplary gold standard image according to some embodiments of the present disclosure.

In some embodiments, the target image generated in 8460 may include a plurality of image noises, and/or the representations of the target objects in the target image may include one or more broken branches (e.g., a coronary artery segmentation result as shown in image A in FIG. 12B), and accordingly, the target image may have a relatively poor visual effect. In some embodiments, to improve the visual effect of the target image, the largest connected domain in the target image may be extracted as the updated target image (e.g., image B in FIG. 12B), in which the image noises and the broken branches may be filtered or removed.

It should be noted that the above descriptions are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, operation 8440 and operation 8450 may be combined into a single operation. As another example, one or more other optional operations (e.g., a storing operation) may be added elsewhere in the process 800. In the storing operation, the processing device 120 may store information and/or data (e.g., the initial images, the intermediate images, the trained processing model, etc.) associated with the image processing system 100 in a storage device (e.g., the storage device 130) disclosed elsewhere in the present disclosure.

FIG. 9 is a diagram illustrating an exemplary process for generating an intermediate image and a target image according to some embodiments of the present disclosure.

As illustrated in FIG. 9, an initial image may be first processed using three second filters (e.g., Gaussian filters with kernels of sizes 3×3, 5×5, and 7×7), respectively, to generate three smoothed initial images. At least one characteristic value of a Hessian matrix corresponding to each pixel or voxel of each of the three smoothed initial images may be determined. A response value corresponding to the each pixel or voxel of each of the three smoothed initial images may be determined by enhancing the at least one characteristic value corresponding to the each pixel or voxel of each of the three smoothed initial images using a first filter (e.g., a tubular filter or a linear filter). A maximum response value corresponding to each pixel or voxel of the initial image may be selected among three response values corresponding to pixels or voxels at a same position in the three smoothed initial images, and an intermediate image may be generated based on a plurality of maximum response values corresponding to a plurality of pixels or voxels of the initial image. The initial image and the intermediate image may be inputted into a trained processing model to obtain a target image (or a candidate target image). In some embodiments, a largest connected domain in the target image (or the candidate target image) may be extracted as an updated target image (or a target image).

Figure 10:
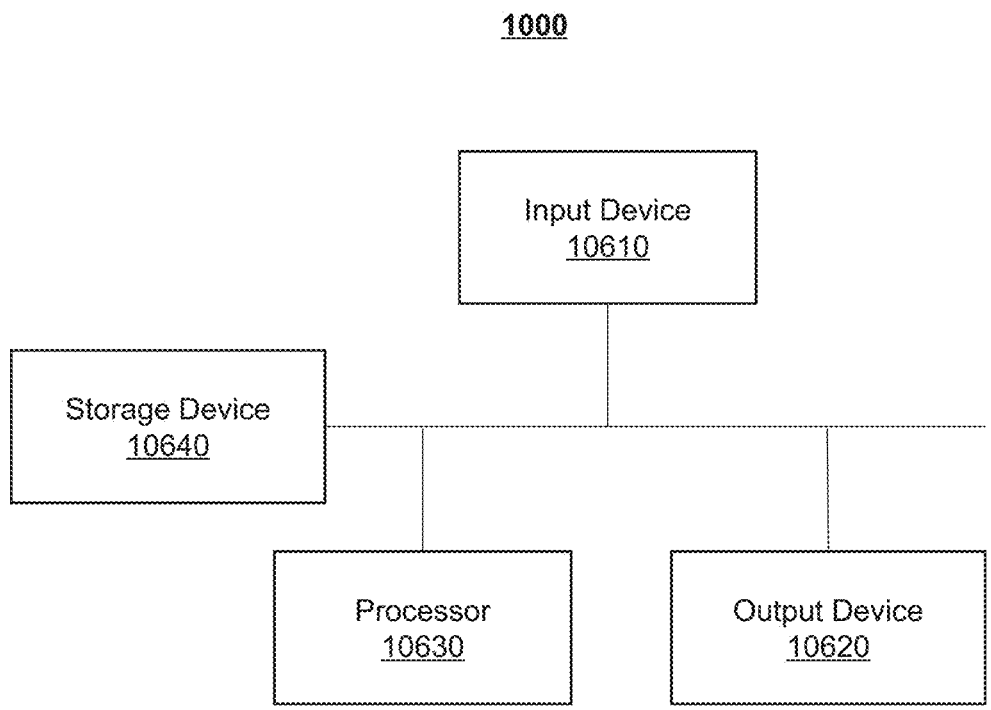
FIG. 10 is a block diagram illustrating an exemplary medical device according to some embodiments of the present disclosure.

FIG. 10 is a block diagram illustrating an exemplary medical device according to some embodiments of the present disclosure. As illustrated in FIG. 10, the medical device 1000 may include an input device 10610, an output device 10620, one or more processors 10630, and a storage device 10640.

The input device 10610 may be configured to obtain an initial image.

The output device 10620 may be configured to display the initial image and/or a segmentation result (i.e., a target image) of one or more target objects.

The processor(s) 10630 may be configured to process data and/or information associated with the image processing system 100.

The storage device 10640 may be configured to store one or more instructions and/or programs.

As shown in FIG. 6, only one processor is illustrated as an example. The input device 10610 may be connected to the output device 10620, the processor 10630, and the storage device 10640 via a bus or any other connection manner. The processor 10630 and the storage device 10640 may be connected via a bus or any other connection manner. For illustration purpose, the input device 10610, the output device 10620, the processor 10630, and/or the storage device 10640 are connected with each other via a bus.

In some embodiments, the processor 10630 may obtain the initial image and an intermediate image corresponding to the initial image from the input device 10610 and/or the storage device 10640. The processor 10630 may input the initial image and/or the intermediate image into a trained processing model stored in the storage device 10640 to generate the target image associated with the one or more target objects.

The storage device 10640 may be used as a computer readable storage medium for storing one or more programs. The one or more programs may be a software program, a computer executable program and/or module, such as instructions/modules (e.g., the obtaining module 4510 and/or the segmentation module 4520 shown in FIG. 4A) corresponding to the process(es) in the present disclosure. The processor 10630 may implement various functions and data processing of the medical device by executing software programs, instructions, and/or modules stored in the storage device 10640.

The storage device 10640 may include a program storage area and a data storage area. The program storage area may store an operation system, one or more programs each of which corresponds to a specific function. The data storage area may store data such as the initial images, the intermediate images, the trained processing model, the target image, etc. In addition, the storage device 10640 may include a high speed random access memory, a non-volatile memory, (e.g., at least one magnetic disk, a flash drive, or other non-volatile solid state storage device), etc. In some embodiments, the storage device 10640 may further include a memory remotely located relative to the processor 10630, which may be connected to a server via a network (e.g., the network 150). The network may include, but are not limited to, an Internet, an intranet, a local area network (LAN), a mobile communication network, or the like, or any combination thereof.

It should be noted that the above descriptions are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

EXAMPLES

The following examples are provided for illustration purposes and are not intended to limit the scope of the present disclosure.

Example 1 Exemplary Heart Image and Coarse Blood Vessel Image Corresponding to the Heart Image FIG. 11A shows an exemplary initial image according to some embodiments of the present disclosure. FIG. 11B shows an exemplary intermediate image corresponding to the initial image according to some embodiments of the present disclosure. The intermediate image may be determined by processing the initial image using one or more filters described in the present disclosure. As shown in FIG. 11A, the initial image is an image of a heart (also referred to as a heart image). The heart image (i.e., the initial image) includes representations of the heart, the spleen, the stomach, bones, a plurality of blood vessels, etc. As shown in FIG. 11B, the intermediate image mainly includes representations of a portion of the plurality of blood vessels (e.g., the coronary artery), and also includes representations of a portion of interfering objects (e.g., one or more bones, tracheas, etc.). One or more main interfering objects (i.e., non-blood vessel objects, such as the heart, the spleen, the stomach, etc.) have low response values in the intermediate image, i.e., values of pixels corresponding to the main interfering objects are lower than values of pixels corresponding to the blood vessels. That is, the intermediate image illustrates a coarse representation of a portion of the blood vessels.

Example 2 Exemplary Coronary Artery Images Generated Based on a Single Source Model and a Multi-Source Model FIG. 12A shows an exemplary image generated based on a single source model, an exemplary image generated based on a multi-source model, and an exemplary gold standard image according to some embodiments of the present disclosure. As illustrated in FIG. 12A, image 1 is a coronary artery image generated by processing a heart image using a single source model (i.e., only the heart image is inputted into the single source model (i.e., a segmentation network (e.g., a coarse segmentation network, a fine segmentation network)) to generate the image 1). Image 2 is a coronary artery image generated by processing the heart image using a multi-source model (i.e., the trained processing model described in the present disclosure, and the heart image and a coarse blood vessel image corresponding to the heart image are inputted into the trained processing model to generate the image 2). Image 3 is a gold standard coronary artery image corresponding to the heart image. In comparison with image 3, image 1 (as marked by the dotted frame 1210 in image 1) misses a portion of the coronary artery (as marked by the dotted frame 1230 in image 3), and image 2 includes the corresponding portion (as marked by the dotted frame 1220 in image 2). That is, the multi-source model (i.e., the trained processing model described in the present disclosure) can improve the segmentation accuracy of the coronary artery.

Example 3 Exemplary Coronary Artery Images Generated with and without Extracting a Largest Connected Domain FIG. 12B shows an exemplary image generated without extracting a largest connected domain, an exemplary image generated with extracting the largest connected domain, and an exemplary gold standard image according to some embodiments of the present disclosure. As illustrated in FIG. 12B, image A is a coronary artery image generated by processing a heart image using a trained processing model without extracting a largest connected domain. Image B is a coronary artery image generated by processing the heart image using a single source model (i.e., only the heart image is inputted into the single source model (i.e., a segmentation network (e.g., a coarse segmentation network, a fine segmentation network)) to generate the image B) and extracting the largest connected domain from the segmentation result. Image C is a gold standard coronary artery image corresponding to the heart image. As shown in FIG. 12B, image A includes representations of coronary arteries with one or more broken branches and image noises (as marked by dotted frames 1240, 1250, and 1260). In comparison with image A, image B has less noises and is similar to image C. That is, by extracting a largest connected domain in the coronary artery image (i.e., the segmentation result generated based on the trained processing model), the precision and accuracy of the coronary artery image can be improved.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer-readable program code embodied thereon.

A non-transitory computer-readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C #, VB. NET, Python or the like, conventional procedural programming languages, such as the "C" programming language, Visual Basic, Fortran, Perl, COBOL, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A method for image processing, comprising:
    obtaining an initial image;
    obtaining an intermediate image corresponding to the initial image, the intermediate image including pixels or voxels associated with at least a portion of a target object in the initial image, wherein the obtaining an intermediate image corresponding to the initial image including:
    obtaining a first filter that is determined based on a shape of the target object;
    determining a plurality of response values by enhancing, using the first filter, characteristic values corresponding to a plurality of pixels or voxels of the initial image; and
    generating the intermediate image based on the plurality of response values;
    obtaining a trained processing model that is trained using a plurality of training samples, wherein the plurality of training samples include a plurality of initial sample images and a plurality of intermediate sample images corresponding to the plurality of initial sample images; and
    generating, based on the initial image and the intermediate image, a target image associated with the target object using the trained processing model.

2. The method of claim 1, wherein the determining a plurality of response values by enhancing, using the first filter, characteristic values corresponding to a plurality of pixels or voxels of the initial image comprises:
    determining a Hessian matrix corresponding to each pixel or voxel of the initial image; and
    determining, based on the Hessian matrix, at least one characteristic value corresponding to the each pixel or voxel.

3. The method of claim 1, wherein the first filter includes at least one of a Gaussian filter, a tubular filter, a linear filter, or a Wiener filter.

4. The method of claim 2, wherein the determining a plurality of response values by enhancing, using the first filter, characteristic values corresponding to a plurality of pixels or voxels of the initial image further comprises:
    smoothing the initial image using a second filter.

5. The method of claim 4, wherein the second filter includes at least one of a Gaussian filter, a linear filter, or a Wiener filter.

6. The method of claim 1, wherein
    the determining a plurality of response values by enhancing, using the first filter, characteristic values corresponding to a plurality of pixels or voxels of the initial image further comprises:
        generating one or more smoothed initial images by smoothing the initial image using one or more second filters;
        determining a Hessian matrix corresponding to each pixel or voxel of each smoothed initial image of the one or more smoothed initial images;
        determining, based on the Hessian matrix, at least one characteristic value corresponding to the each pixel or voxel of the each smoothed initial image;
        determining a response value corresponding to the each pixel or voxel of the each smoothed initial image by enhancing, using the first filter, the at least one characteristic value corresponding to the each pixel or voxel of the each smoothed initial image; and
        determining, based on one or more response values corresponding to pixels or voxels in the one or more smoothed initial images, a target response value corresponding to each pixel or voxel of the initial image; and
    the generating the intermediate image based on a plurality of response values comprises:
        generating, based on a plurality of target response values corresponding to the plurality of pixels or voxels of the initial image, the intermediate image.

7. The method of claim 1, wherein the generating a target image comprises:
    fusing the initial image and the intermediate image to obtain a fusion image; and
    inputting the fusion image into the trained processing model to output the target image.

8. The method of claim 7, wherein the fusing the initial image and the intermediate image comprises:
    generating the fusion image by processing a first value of each pixel or voxel of the initial image with a second value of a corresponding pixel or voxel of the intermediate image.

9. The method of claim 8, wherein the processing a first value of each pixel or voxel of the initial image with a second value of a corresponding pixel or voxel of the intermediate image comprises:
    determining a value of a pixel or voxel of the fusion image based on a sum or product of the first value and the second value.

10. The method of claim 1, wherein the generating a target image comprises:
    inputting, in a parallel mode, the initial image and the intermediate image into two different input channels of the trained processing model to output the target image.

11. The method of claim 1, further comprising:
    obtaining an initial processing model; and
    training the initial processing model to obtain the trained processing model.

12. The method of claim 1, wherein the trained processing model is generated according to a process, the process including:

obtaining an initial processing model; and generating the trained processing model by training the initial processing model using the plurality of training samples.

13. The method of claim 1, wherein the trained processing model is configured to segment, based on the intermediate image, the target object from the initial image, and the trained processing model includes a coarse segmentation network and a fine segmentation network, wherein the coarse segmentation network is configured to roughly determine locations of the target object in the initial image and generate a preliminary segmentation image of the target object, and the fine segmentation network is configured to determine the target image of the target object, the determining the target image of the target object comprising:

determining one or more extracted regions in the initial image corresponding to the target object in the preliminary segmentation image; and inputting the one or more extracted regions and the intermediate image into the fine segmentation network to generate the target image of the target object.

14. The method of claim 1, further comprising:

updating the target image, including:

extracting a largest connected domain in the target image as an updated target image to filter noises and broken branches.

15. A system for image processing, comprising:

at least one storage device storing executable instructions, and at least one processor in communication with the at least one storage device, when executing the executable instructions, causing the system to perform operations including:

obtaining an initial image;

obtaining an intermediate image corresponding to the initial image, the intermediate image including pixels or voxels associated with at least a portion of a target object in the initial image, wherein the obtaining an intermediate image corresponding to the initial image including:

obtaining a first filter that is determined based on a shape of the target object;

determining a plurality of response values by enhancing, using the first filter, characteristic values corresponding to a plurality of pixels or voxels of the initial image; and generating the intermediate image based on the plurality of response values;

obtaining a trained processing model that is trained using a plurality of training samples, wherein the plurality of training samples include a plurality of initial sample images and a plurality of intermediate sample images corresponding to the plurality of initial sample images; and generating, based on the initial image and the intermediate image, a target image associated with the target object using the trained processing model.

16. A non-transitory computer readable medium, comprising at least one set of instructions for image processing, wherein when executed by one or more processors of a computing device, the at least one set of instructions causes the computing device to perform a method, the method comprising:

obtaining an initial image;

obtaining an intermediate image corresponding to the initial image, the intermediate image including pixels or voxels associated with at least a portion of a target object in the initial image, wherein the obtaining an intermediate image corresponding to the initial image including:

obtaining a first filter that is determined based on a shape of the target object;

determining a plurality of response values by enhancing, using the first filter, characteristic values corresponding to a plurality of pixels or voxels of the initial image; and generating the intermediate image based on the plurality of response values;

obtaining a trained processing model that is trained using a plurality of training samples, wherein the plurality of training samples include a plurality of initial sample images and a plurality of intermediate sample images corresponding to the plurality of initial sample images; and generating, based on the initial image and the intermediate image, a target image associated with the target object using the trained processing model.

17. The method of claim 7, wherein the determining, based on one or more response values corresponding to pixels or voxels in the one or more smoothed initial images, a target response value corresponding to each pixel or voxel of the initial image comprises:

selecting, among one or more response values corresponding to pixels or voxels at a same position in the one or more smoothed initial images, a maximum response value corresponding to the each pixel or voxel of the initial image; and determining the maximum response value corresponding to the each pixel or voxel of the initial image as the target response value corresponding to the each pixel or voxel of the initial image.

18. The method of claim 1, wherein the determining a plurality of response values by enhancing, using the first filter, characteristic values corresponding to a plurality of pixels or voxels of the initial image comprises:

generating two or more smoothed initial images by smoothing the initial image using two or more second filters;

determining a Hessian matrix corresponding to each pixel or voxel of each smoothed initial image of the two or more smoothed initial images;

determining, based on the Hessian matrix, at least one characteristic value corresponding to the each pixel or voxel of the each smoothed initial image; and determining a response value corresponding to the each pixel or voxel of the each smoothed initial image by enhancing, using the first filter, the at least one characteristic value corresponding to the each pixel or voxel of the each smoothed initial image; and the generating the intermediate image based on a plurality of response values comprises:

determining, based on one or more response values corresponding to pixels or voxels in the two or more smoothed initial images, a count number of pixels or voxels whose response values are greater than a threshold in the each smoothed initial image; and generating, based on two or more count numbers of pixels or voxels of the two or more smoothed initial images, the intermediate image.

19. The method of claim 13, wherein the generating the trained processing model by training the initial processing model using the plurality of training samples comprises:
- determining a plurality of predicted images by inputting the plurality of initial sample images and the plurality of intermediate sample images corresponding to the plurality of initial sample images into the initial processing model;
- updating one or more parameters of the initial processing model based on a difference between each of the plurality of predicted images and a corresponding reference image; and
- determining the trained processing model based on the one or more updated parameters.

20. The method of claim 19, wherein the updating one or more parameters of the initial processing model based on a difference between each of the plurality of predicted images and a corresponding reference image further comprises:
- obtaining a plurality of reference images corresponding to the initial sample images;
- determining the difference between each of the plurality of predicted images and the corresponding reference image by comparing each of the predicted image corresponding to an initial sample image with the reference image corresponding to the initial sample image;
- determining an accuracy of the processing model in the current iteration based on the difference; and
- updating the parameters of the processing model in a plurality of iterations until the accuracy satisfies a predetermined accuracy threshold.

* * * * *